(12) United States Patent
Furuhata

(10) Patent No.: US 9,372,084 B2
(45) Date of Patent: Jun. 21, 2016

(54) GYRO SENSOR, ELECTRONIC APPARATUS, AND MOBILE UNIT

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 360 days.

(21) Appl. No.: 13/855,152

(22) Filed: Apr. 2, 2013

(65) Prior Publication Data

US 2013/0283909 A1    Oct. 31, 2013

(30) Foreign Application Priority Data

Apr. 4, 2012 (JP) ................................. 2012-085862
Feb. 15, 2013 (JP) ................................. 2013-028187

(51) Int. Cl.
*G01C 19/56* (2012.01)
*G01C 19/5747* (2012.01)

(52) U.S. Cl.
CPC ............ *G01C 19/56* (2013.01); *G01C 19/5747* (2013.01)

(58) Field of Classification Search
CPC .................................................. G01C 19/5747
USPC ......................................................... 73/504.12
See application file for complete search history.

(56) References Cited

U.S. PATENT DOCUMENTS

| | | | |
|---|---|---|---|
| 6,705,164 B2 | 3/2004 | Willig et al. | |
| 6,752,017 B2 * | 6/2004 | Willig et al. | 73/504.04 |
| 6,766,689 B2 | 7/2004 | Spinola Durante et al. | |
| 6,928,872 B2 | 8/2005 | Durante et al. | |
| 2004/0123660 A1 | 7/2004 | Willig et al. | |
| 2006/0117852 A1 | 6/2006 | Park et al. | |
| 2007/0234803 A1 | 10/2007 | Gomez et al. | |
| 2008/0276706 A1 * | 11/2008 | Hartmann et al. | 73/504.04 |
| 2008/0282833 A1 | 11/2008 | Chaumet | |
| 2010/0037690 A1 * | 2/2010 | Gunthner et al. | 73/504.04 |
| 2011/0132087 A1 * | 6/2011 | Ohms et al. | 73/504.12 |
| 2012/0222483 A1 * | 9/2012 | Blomqvist et al. | 73/504.12 |
| 2012/0260737 A1 | 10/2012 | Chaumet | |

FOREIGN PATENT DOCUMENTS

| | | |
|---|---|---|
| JP | 2006-515928 | 6/2006 |
| JP | 2013-217666 A | 10/2013 |

OTHER PUBLICATIONS

G. M. Rebeiz, "RF MEMS Theory, Design, and Technology", John Wiley & Sons, Inc., Wiley Interscience, 2003, 2.1 Spring Constant of Fixed-Fixed Beams (495 pages).

(Continued)

*Primary Examiner* — John Chapman, Jr.
(74) *Attorney, Agent, or Firm* — Harness, Dickey & Pierce, P.L.C.

(57) ABSTRACT

A gyro sensor includes a vibrator, a spring part extending from a first fixing part to the vibrator in a direction along a first axis, a drive part that excites the vibrator, and a detection part provided on the vibrator, wherein the vibrator has, in a plan view, first and second vibrating parts arranged side by side in the direction along the first axis and drive-vibrate in anti-phase with each other, a connecting spring part that connects the first and second vibrating parts in the direction along the first axis, and a first elastic member extending from the connecting spring part in a direction along a second axis intersecting with the first axis and fixed to a second fixing part.

20 Claims, 22 Drawing Sheets

(56) References Cited

OTHER PUBLICATIONS

Prof. Clark T.C. Nguyen, EE C245-ME C218: Introduction to MEMS Module 8: Microstructural Elements, Oct. 12, 2010, (21 pages).

Wai-Chi et al., "Formulation of Stiffness Constant and Effective Mass for a Folded Beam", School of Mechanical Engineering, Malaysia, and Institute of Miceoengineering and Nanoelectronics, Malaysia, Arch. Mech., 62, 5, pp. 405-418, Warszawa, 2010.

* cited by examiner

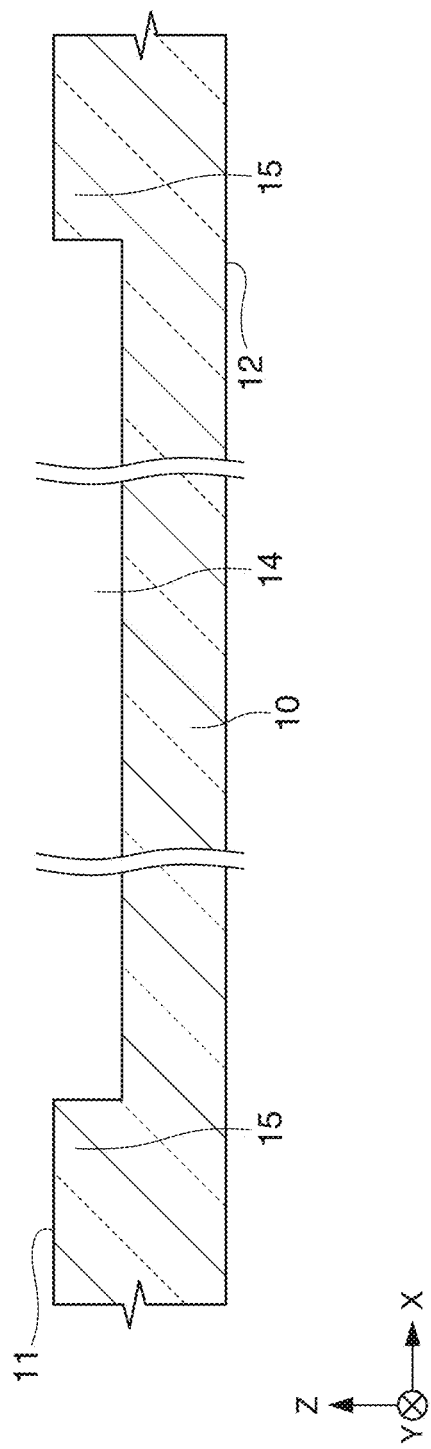

GYRO SENSOR, ELECTRONIC APPARATUS, AND MOBILE UNIT

BACKGROUND

1. Technical Field

The present invention relates to a gyro sensor, an electronic apparatus, and a mobile unit.

2. Related Art

In related art, for example, gyro sensors (capacitance MEMS gyro sensor elements) that detect angular velocities using silicon MEMS (Micro Electro Mechanical System) technologies have been developed. For example, Patent Document 1 (JP-T-2006-515928) has disclosed a gyro sensor including a drive system in which two vibrators (movable structures) are connected by a spring and the vibrators vibrate (also referred to as "tuning-fork vibrate").

In the case where the gyro sensor is manufactured, using a microfabrication technology such as wet-etching, silicon structures each including a vibrator on which a spring for support and a spring for connection are independently prepared from a silicon substrate provided on a table for manufacture. Then, the springs for connection are connected to each other, and thereby, the gyro sensor having the above described structure may be manufactured.

However, in the manufacturing process, two vibrators are connected for formation, and the connecting part is relatively soft. Accordingly, in the wet-etching processing, at removal of a sacrifice layer by etching, when water of the etchant is evaporated, the connecting part may fall out and stick to the base (hereinafter, referred to as "sticking") because of the action of the meniscus force due to surface tension, the electrostatic force, or the like.

As a solution to prevent the sticking, it is considered that an anchor is provided in the connecting part of the two springs for fixing and supporting the connecting part and the connecting part is anchored to the substrate. However, in the structure, when the drive system including the two vibrating parts vibrates in anti-phase, the vibration energy exchange between each other is inhibited by the anchor. Here, "anti-phase" refers to movements of two vibrators away from each other or close to each other. Further, "in-phase" refers to movements of two vibrators in the same directions.

SUMMARY

An advantage of some aspects of the invention is to provide a gyro sensor that may prevent sticking in a drive system in which two vibrating parts vibrate in anti-phase without inhibiting vibration energy exchange between each other. Another advantage of some aspects of the invention is to provide an electronic apparatus having the gyro sensor.

The invention can be implemented as the following embodiments or application examples.

APPLICATION EXAMPLE 1

A gyro sensor according to this application example of the invention includes a vibrator, a first fixing part and a second fixing part provided on a base, a spring part extending from the first fixing part to the vibrator in a direction along a first axis, a drive part that excites the vibrator, and a detection part provided on the vibrator, wherein the vibrator has, in a plan view, first and second vibrating parts arranged side by side in the direction along the first axis and drive-vibrate in anti-phase with each other, a connecting spring part that connects the first and second vibrating parts in the direction along the first axis, and a first elastic member extending from the connecting spring part in a direction along a second axis intersecting with the first axis and fixed to the second fixing part.

According to the gyro sensor, the connection spring part is indirectly fixed to the second fixing part via the elastic member that may be elastically deformed. The connecting spring part is supported, and thereby, sticking may be prevented. Further, the elastic member is elastically deformable, and thus, does not inhibit the vibration energy exchange. Therefore, the gyro sensor that may improve the reliability may be provided.

Note that, in the description related to the invention, when the word "on" used such that "'on' a particular material (as below, referred to as "A"), another particular material (as below, referred to as "B") is formed" includes when B is directly formed on A and when B is formed via another object on A.

Further, in the description related to the invention, the word "a plan view" is used as a word that means "a plan view as seen from a normal line direction of a base surface of a base on which a gyro sensor is provided."

APPLICATION EXAMPLE 2

In the gyro sensor according to the application example, the vibrator may include a pair of the connecting spring parts and a pair of the first elastic members.

According to the gyro sensor, in the drive system in which two vibrators vibrate in anti-phase, the gyro sensor of preventing sticking without inhibiting the vibration energy exchange between each other may be provided.

APPLICATION EXAMPLE 3

In the gyro sensor according to the application example, the elastic member may be a plate-like member deformed in the direction along the first axis.

According to the gyro sensor, in the drive system in which the two vibrating parts more reliably vibrate in anti-phase, the gyro sensor of preventing sticking without inhibiting the vibration energy exchange between each other may be provided.

APPLICATION EXAMPLE 4

In the gyro sensor according to the application example, the elastic member may further have a first extension part extending from the connecting spring part in the direction along the second axis, and a second extension part folding back from the first extension part and further extending toward the connecting spring part side.

According to the gyro sensor, the longer elastic member may be formed, and thus, in the vibration mode of the drive system, the drive frequency of the in-phase mode may be separated from the anti-phase mode. Therefore, the gyro sensor that may suppress the influence by the in-phase mode on the vibration mode of the drive system may be provided.

APPLICATION EXAMPLE 5

In the gyro sensor according to the application example, the elastic member may further have a first extension part extending from the connecting spring part in the direction along the second axis, and a third extension part extending in the direction along the second axis while extending back and forth from the first extension part in the direction along the first axis.

According to the gyro sensor, the longer elastic member may be formed, and thus, in the vibration mode of the drive system, the drive frequency of the in-phase mode may be separated from the anti-phase mode. Therefore, the gyro sensor that may suppress the influence by the in-phase mode may be provided.

APPLICATION EXAMPLE 6

In the gyro sensor according to the application example, given that a spring constant of the connecting spring part from an extension position in which the first elastic member extends to the first vibrating part is a first spring constant and a spring constant from the extension position to the second vibrating part is a second spring constant, the first elastic member may be provided so that the first spring constant and the second spring constant may be equal.

According to the gyro sensor, the gyro sensor that may more reliably suppress the influence by the in-phase mode may be provided.

APPLICATION EXAMPLE 7

In the gyro sensor according to the application example, a spring constant of the elastic member in the direction along the first axis may be smaller than a spring constant of the connecting spring part in the direction along the first axis.

According to the gyro sensor, the gyro sensor that may more reliably suppress the influence by the in-phase mode may be provided.

APPLICATION EXAMPLE 8

In the gyro sensor according to the application example, the connecting spring part may include a first side surface from which the first elastic member extends and a second side surface opposite to the first side surface, and a second elastic member extending from the second side surface and fixed to a third fixing part may be further provided.

According to the gyro sensor, the gyro sensor that may suppress the influence by the torsional mode may be provided.

APPLICATION EXAMPLE 9

In the gyro sensor according to the application example, the second elastic member may extend in the extension position of the connecting spring part in which the first elastic member extends.

APPLICATION EXAMPLE 10

In the gyro sensor according to the application example, a width of at least one of the first elastic member and the second elastic member may be from 0.01 μm to 12 μm.

APPLICATION EXAMPLE 11

An electronic apparatus according to this application example includes the gyro sensor according to the application example.

APPLICATION EXAMPLE 12

A mobile unit according to this application example includes the gyro sensor according to the application example.

BRIEF DESCRIPTION OF THE DRAWINGS

The invention will be described with reference to the accompanying drawings, wherein like numbers reference like elements.

FIG. 21 is a sectional view schematically showing a manufacturing step of the gyro sensor according to the embodiment.

DESCRIPTION OF EXEMPLARY EMBODIMENTS

As below, preferred embodiments of the invention will be explained in detail using the drawings. Note that the embodiments to be explained do not unduly limit the invention described in the appended claims. Further, all of the configurations to be explained are not the essential component elements of the invention.

1. Gyro Sensor

1-1. Configuration of Gyro Sensor According to First Embodiment

Figure 1:
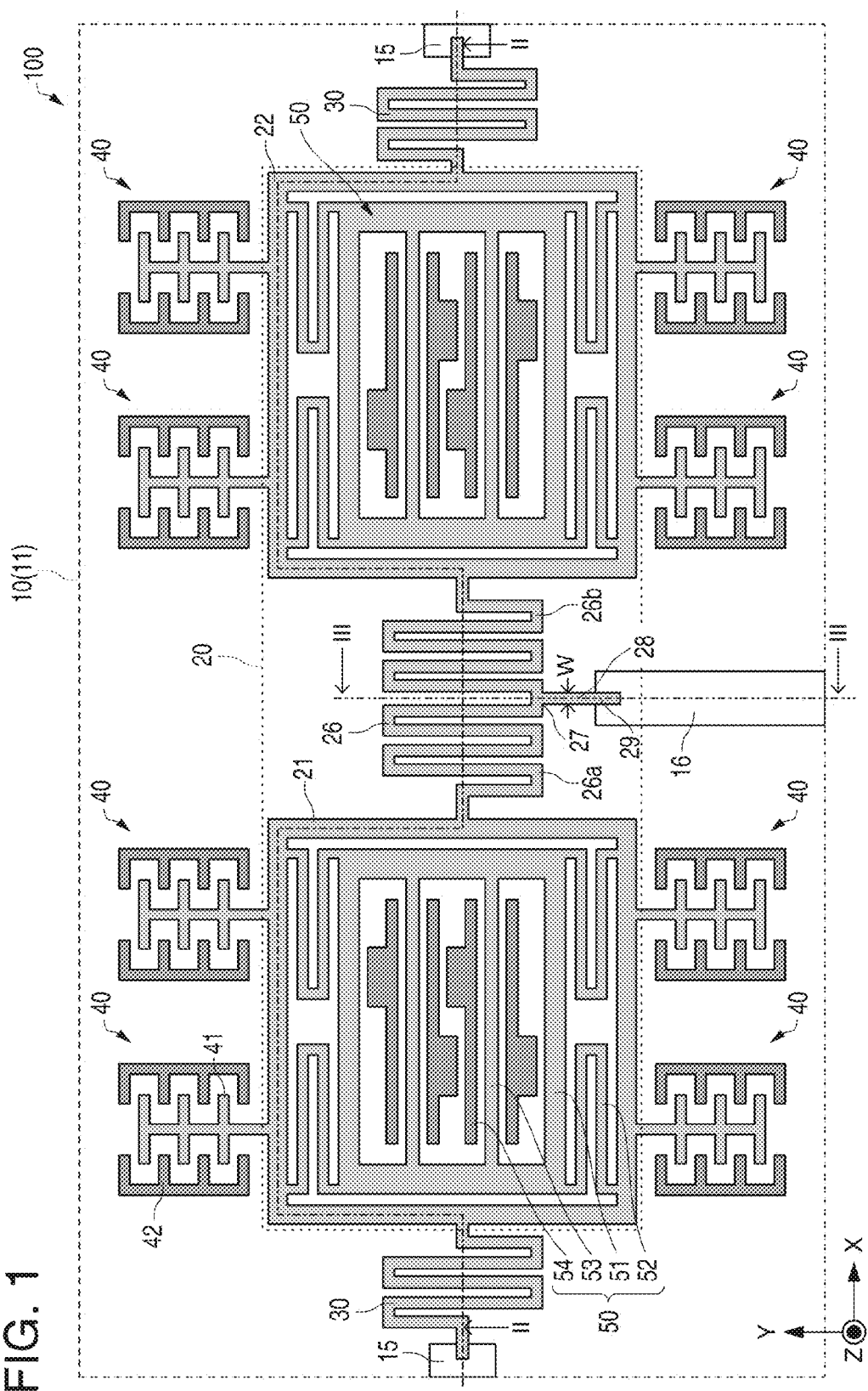
FIG. 1 is a plan view schematically showing a gyro sensor according to a first embodiment.
Figure 2:
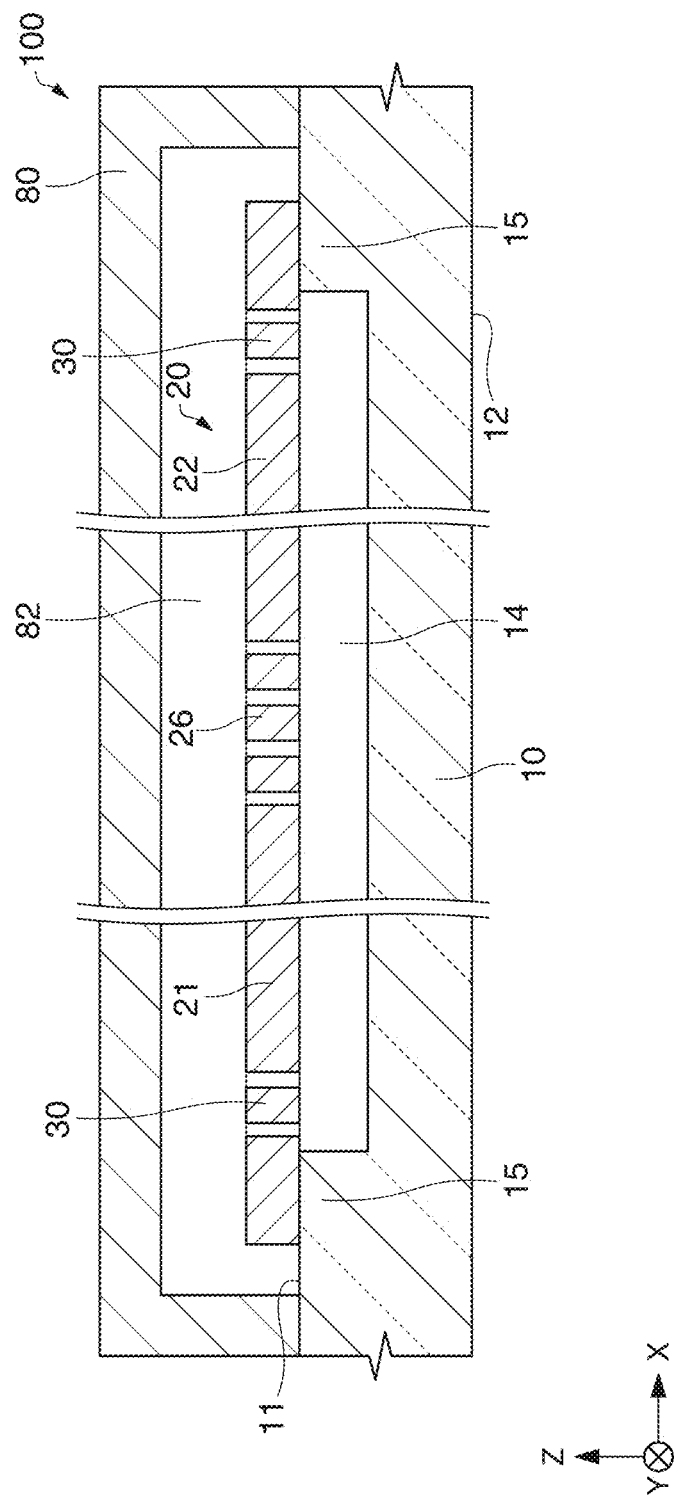
FIG. 2 is a sectional view schematically showing the gyro sensor according to the first embodiment.
Figure 3:
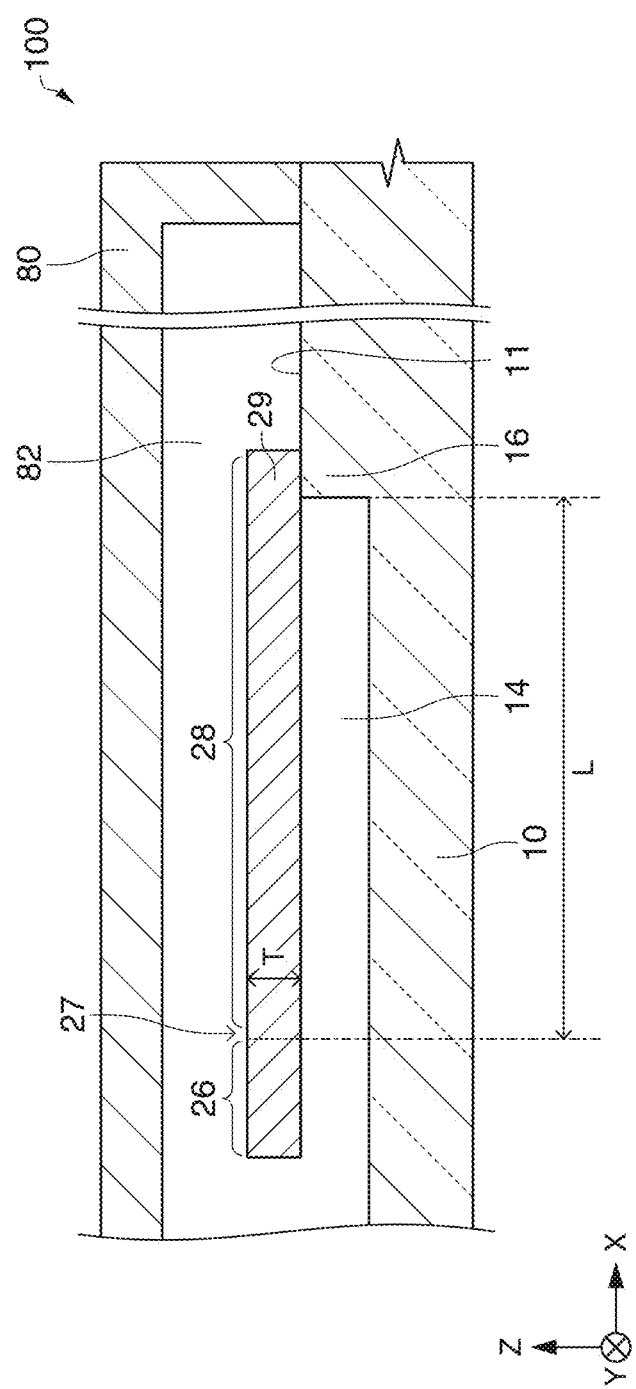
FIG. 3 is a sectional view schematically showing the gyro sensor according to the first embodiment.

First, a gyro sensor according to a first embodiment will be explained with reference to the drawings. FIG. 1 is a plan view schematically showing a gyro sensor 100 according to the first embodiment. FIG. 2 is a sectional view schematically showing the gyro sensor 100 according to the first embodiment along line II-II of FIG. 1. FIG. 3 is a sectional view schematically showing the gyro sensor 100 according to the first embodiment along line III-III of FIG. 1. Note that, in FIGS. 1 to 3, an X-axis (first axis), a Y-axis (second axis), and a Z-axis (third axis) are shown as three axes orthogonal to one another.

As shown in FIGS. 1 and 2, the gyro sensor 100 may include a base 10, a vibrator 20, spring parts 30, drive parts 40, and detection parts 50. In the gyro sensor 100, the detection part 50 is a gyro sensor element (capacitance MEMS gyro sensor element) that detects an angular velocity around the Z-axis. Note that, for convenience, the base 10 and a lid 80 are shown in perspective views.

The material of the base 10 is glass or silicon, for example. The base 10 has a first surface 11 and a second surface 12 opposite to the first surface 11 as shown in FIG. 2. A concave part 14 is provided on the first surface 11. On the concave part 14, the vibrator 20 (connecting spring part 26) and the spring parts 30 are provided via a clearance. By the concave part 14, the vibrator 20 can move in a desired direction without obstruction by the base 10. The planar shape of the concave part 14 (the shape as seen from the Z-axis direction) is not particularly limited, however, a rectangle in the example shown in FIG. 1. The concave part 14 is formed by a photolithography technology and an etching technology, for example.

The base 10 has first fixing parts 15 and a second fixing part 16. As shown in FIGS. 1 to 3, the first fixing parts 15 and the second fixing part 16 are regions appropriately provided on the first surface 11 in response to the form of the vibrator 20.

The first fixing part 15 is a part to which one end of the spring part 30 supporting the vibrator 20 is fixed (bonded) for supporting the vibrator 20 via the spring part 30. As shown in FIGS. 1 and 2, the first fixing parts 15 may be provided to sandwich the vibrator 20 in the X-axis direction.

The second fixing part 16 is a part to which one end of an elastic member 28 extending from the connecting spring part 26 of the vibrator 20 is fixed (bonded) for supporting the connecting spring part 26 via the elastic member 28. As shown in FIG. 3, the second fixing part 16 is provided at least to support the elastic member 28.

The fixing (bonding) method of the first surface 11 (base 10) of the first fixing parts 15 and the second fixing part 16 to the later-described spring parts 30, driving fixed electrode parts 42, detection fixed electrode parts 54, etc. is not particularly limited, however, for example, when the material of the base 10 is glass and the material of the vibrators 20 etc. is silicon, anodic bonding may be applied.

The vibrator 20 is housed in a cavity 82 surrounded by the base 10 and the lid 80 as shown in FIG. 2. The vibrator 20 is provided on the base 10 via a clearance (concave part 14). The vibrator 20 is supported by the first surface 11 of the base 10 (on the base 10) via the spring parts 30. The vibrator 20 may have a first and second vibrating parts 21, 22, the connecting spring part 26, and the elastic member 28 as shown in FIG. 1.

The material of the vibrator 20 is silicon provided with conductivity by doped impurities of phosphorus, boron, or the like, for example. The vibrator 20 is formed by processing of a silicon substrate (not shown) using a photolithography technology and an etching technology, for example.

The first vibrating part 21 and the second vibrating part 22 are supported by the first fixing parts 15 via the spring parts 30, and provided apart from the base 10. More specifically, the first vibrating part 21 and the second vibrating part 22 are provided on the base 10 via the clearance (concave part 14). The first vibrating part 21 and the second vibrating part 22 may have frame shapes (open box shapes), for example. The first vibrating part 21 and the second vibrating part 22 may have shapes symmetric with respect to the boundary line III-III (the line along the Y-axis) between them as shown in FIG. 1. The first vibrating part 21 and the second vibrating part 22 are arranged side by side in the direction along the X-axis and connected by the connecting spring part 26.

The connecting spring part 26 is adapted to displace the first vibrating part 21 and the second vibrating part 22 in the X-axis direction. More specifically, the connecting spring part 26 has a shape extending in the direction along the X-axis between the first vibrating part 21 and the second vibrating part 22, and extending in the X-axis direction while extending back and forth in the Y-axis direction. Thereby, the first vibrating part 21 and the second vibrating part 22 may vibrate in anti-phase with each other in the X-axis direction.

The elastic member 28 (hereinafter, also referred to as "first elastic member 28") extends from the connecting spring part 26 in the direction along the Y-axis (the direction orthogonal to the direction in which the vibrator 20 vibrates) and is fixed (bonded) to the second fixing part 16. Specifically, as shown in FIGS. 1 and 3, one end of the elastic member 28 is connected to the connecting spring part 26 in an extension position 27. Further, the other end (an edge part 29) of the elastic member 28 is fixed (bonded) to the second fixing part 16 (the first surface 11 of the base 10). The configuration of the elastic member 28 is not limited as long as it may be elastically deformed with a predetermined spring constant in the direction along the X-axis direction (the direction in which the vibrator 20 vibrates).

Here, the spring constant of the elastic member 28 in the direction along the X-axis may be set to be smaller than the spring constant of the connecting spring part 26 in the direction along the X-axis.

Further, the location of the extension position 27 in which the elastic member 28 extends may be determined so that the spring constant ($K_1$) of a connecting spring part 26a from the extension position 27 to the first vibrating part 21 and the spring constant ($K_2$) of a connecting spring part 26b from the extension position 27 to the second vibrating part 22 may be equal.

The elastic member 28 may be a plate-like member (rectangular parallelepiped) having a width W (in the X-axis direction), a thickness T (in the Z-axis direction), and a length L (in the Y-axis direction) as shown in FIGS. 1 and 3, for example. Note that the length L of the elastic member 28 is a length without the edge part 29 bonded to the second fixing part 16 and not substantially elastically deformable. Here, the elastic member 28 has a shape with a high aspect ratio (W<T). The shape of the elastic member 28 (width W, thickness T, length L) is appropriately adjusted so that a desired spring constant of the elastic member 28 may be obtained.

For example, the width W of the elastic member may be within a range from 0.01 μm to 12 μm. Thereby, the influence by the frequency of the in-phase mode may be effectively suppressed from the frequency of the anti-phase mode. Further, more preferably, the width W of the elastic member may be within a range from 0.12 μm to 12 μm.

The elastic member 28 has the above described shape, and thus, high alignment accuracy is not required and the spring constant of the elastic member 28 may be simply adjusted in the manufacturing process. Further, the elastic member 28 has the highly symmetrical shape, and the symmetry of the vibrator 20 in the X-axis direction may be easily maintained.

The spring part 30 is adapted to displace the vibrator 20 in the X-axis direction. More specifically, the spring part 30 has a shape extending in the direction along the X-axis from the first fixing part 15 to the vibrator 20 (the first vibrating part 21 or the second vibrating part 22) and extending in the X-axis direction while extending back and forth in the Y-axis direction. Specifically, one end of the spring part 30 is bonded (fixed) to the first fixing part 15 (the first surface 11 of the base 10). Further, the other end of the spring part 30 is bonded (fixed) to the vibrator 20 (the first vibrating part 21 or the second vibrating part 22). In the illustrated example, the two spring parts 30 are provided to sandwich the vibrator 20 in the X-axis direction.

The material of the spring part 30 is silicon provided with conductivity by doped impurities of phosphorus, boron, or the like, for example. The spring part 30 is formed by processing of a silicon substrate (not shown) integrally with the vibrator 20 using a photolithography technology and an etching technology, for example.

The drive part 40 has a mechanism that may excite the first vibrating part 21 or the second vibrating part 22 of the vibrator 20. Note that the configuration and the number of the drive parts 40 are not particularly limited as long as the drive part may excite the first vibrating part 21 or the second vibrating part 22.

For example, the drive part 40 may be provided directly on the vibrator 20. As shown in FIG. 1, the drive part may include a driving movable electrode part 41 connected at the outside of the vibrator 20 and the driving fixed electrode part 42 oppositely provided via a predetermined distance from the driving movable electrode part 41. Further, through not illustrated, the drive part 40 may have a mechanism of exciting the vibrator 20 not by being directly connected to the vibrator 20, but by electrostatic force or the like, and be provided outside of the vibrator 20.

A plurality of the driving movable electrode parts 41 may be provided to be connected to the first vibrating part 21 and the second vibrating part 22. In the illustrated example, the driving movable electrode part 41 may be a comb-teeth electrode having a trunk part extending from the first, second vibrating parts 21, 22 in the +Y-direction (or the Y-direction), and a plurality of branch parts extending from the base part in the +-X direction and the X-direction.

The driving fixed electrode part 42 is provided outside of the driving movable electrode part 41. The driving fixed electrode part 42 is bonded (fixed) to the first surface 11 of the base 10. In the illustrated example, a plurality of the driving fixed electrode parts 42 are oppositely provided via the driving movable electrode part 41. When the driving movable electrode part 41 has the comb-teeth shape, the shape of the driving fixed electrode part 42 may be a comb-teeth electrode corresponding to the driving movable electrode part 41.

The driving movable electrode parts 41 and the driving fixed electrode parts 42 are electrically connected to a power supply (not shown). When voltages are applied to the driving movable electrode parts 41 and the driving fixed electrode parts 42, electrostatic forces may be generated between the driving movable electrode parts 41 and the driving fixed electrode parts 42. Thereby, the spring parts 30 may be expanded and contracted along the X-axis, and the vibrator 20 may be vibrated along the X-axis.

The material of the drive part 40 is silicon provided with conductivity by doped impurities of phosphorus, boron, or the like, for example. The drive part 40 is formed by processing of a silicon substrate (not shown) integrally with the vibrator 20 using a photolithography technology and an etching technology, for example.

The detection parts 50 are connected to the vibrator 20. In the illustrated example, the detection parts 50 are respectively provided inside of the first vibrating part 21 and the second vibrating part 22. The detection part 50 may have a detection support part 51, a detection spring part 52, a detection movable electrode part 53, and the detection fixed electrode part 54. Note that, though not illustrated, the detection parts 50 may be provided outside of the first vibrating part 21 and the second vibrating part 22 as long as they are connected to the vibrator 20.

The shape of the detection support part 51 is not particularly limited as long as it is an annular shape. The detection support part 51 has a frame shape, for example.

The detection spring part 52 is provided outside of the detection support part 51. The detection spring part 52 connects the detection support part 51 and the vibrator 20 (the first vibrating part 21 or the second vibrating part 22). More specifically, one end of the detection spring part 52 is connected to the detection support part 51. The other end of the detection spring part 52 is connected to the vibrator 20 (the first vibrating part 21 or the second vibrating part 22). The detection spring part 52 is adapted to displace the detection support part 51 in the Y-axis direction. More specifically, the detection spring part 52 has a shape extending in the Y-axis direction while extending back and forth in the X-axis direction.

The detection movable electrode part 53 is provided to be connected to the detection support part 51 inside of the detection support part 51. In the illustrated example, the detection movable electrode part 53 extends along the X-axis.

The detection fixed electrode part 54 is provided inside of the detection support part 51. The detection fixed electrode part 54 is bonded (fixed) to the first surface 11 of the base 10. In the illustrated example, a plurality of the detection fixed electrode parts 54 are oppositely provided via the detection movable electrode part 53.

The material of the detection part 50 is silicon provided with conductivity by doped impurities of phosphorus, boron, or the like, for example. The detection part 50 is formed by processing of a silicon substrate (not shown) integrally with the vibrator 20 using a photolithography technology and an etching technology, for example.

The lid 80 is provided on the base 10. The base 10 and the lid 80 may form a package as shown in FIG. 2. The base 10 and the lid 80 may form the cavity 82 and house the vibrator 20 in the cavity 82. For example, the space between the base 10 and the lid 80 shown in FIG. 2 may be filled with an adhesive member or the like and, in this case, the cavity 82 may be sealed by an inert gas (e.g., nitrogen gas) or a vacuum atmosphere.

The material of the lid 80 is silicon or glass, for example. The bonding method of the lid 80 and the base 10 is not particularly limited, however, for example, when the material of the base 10 is glass and the material of the lid 80 is silicon, the base 10 and the lid 80 may be anodically bonded.

The gyro sensor 100 according to the first embodiment has the following features, for example.

According to the gyro sensor 100, the elastic member 28 extending from the connecting spring part 26 in the direction along the Y-axis and fixed to the second fixing part 16. As described above, the gyro sensor 100 has the elastic member 28, and thus, the connecting spring part 26 is supported by the elastic member 28 fixed (anchored) to the second fixing part 16. Thereby, sticking that the connecting spring part 26 sticks to the base 10 may be prevented.

Further, the elastic member 28 is elastically deformable in the vibration direction of the vibrator 20, and may support the connecting spring part 26 without inhibiting vibration energy exchange between the first vibrating part 21 and the second vibrating part 22.

Furthermore, when the vibrator 20 is formed by the first and second vibrating parts 21, 22 and when the plurality of spring parts 30 are provided, the dimensions of the respective members are not equal and variations (errors) are caused in the dimensions. Thereby, as the vibration mode of the drive system, not only the desired anti-phase mode but also the in-phase mode is generated. According to the gyro sensor 100, the elastic member 28 fixed (anchored) to the second fixing part 16 is provided, and thus, the influence by the drive frequency of the in-phase mode may be controlled in the vibration mode of the drive system. Thereby, the gyro sensor 100 that may suppress the influence by the in-phase mode on the vibration mode and improve the reliability may be provided. The details will be described later.

Further, according to the gyro sensor 100, the spring constant of the elastic member 28 in the direction along the X-axis may be set to be smaller than the spring constant of the connecting spring part 26 in the direction along the X-axis. Thereby, the gyro sensor 100 that does not inhibit vibration energy exchange between the first vibrating part 21 and the second vibrating part 22 more reliably may be provided.

In addition, according to the gyro sensor 100, the location of the extension position 27 in which the elastic member 28 extends may be determined so that the spring constant ($K_1$) of the connecting spring part 26a from the extension position 27 to the first vibrating part 21 and the spring constant ($K_2$) of the connecting spring part 26b from the extension position 27 to the second vibrating part 22 may be equal. Thereby, the symmetry of the spring constants of the vibrator 20 is improved, and thereby, the gyro sensor 100 that does not inhibit vibration energy exchange between the first vibrating part 21 and the second vibrating part 22 more reliably may be provided.

First Modified Example

Figure 4:
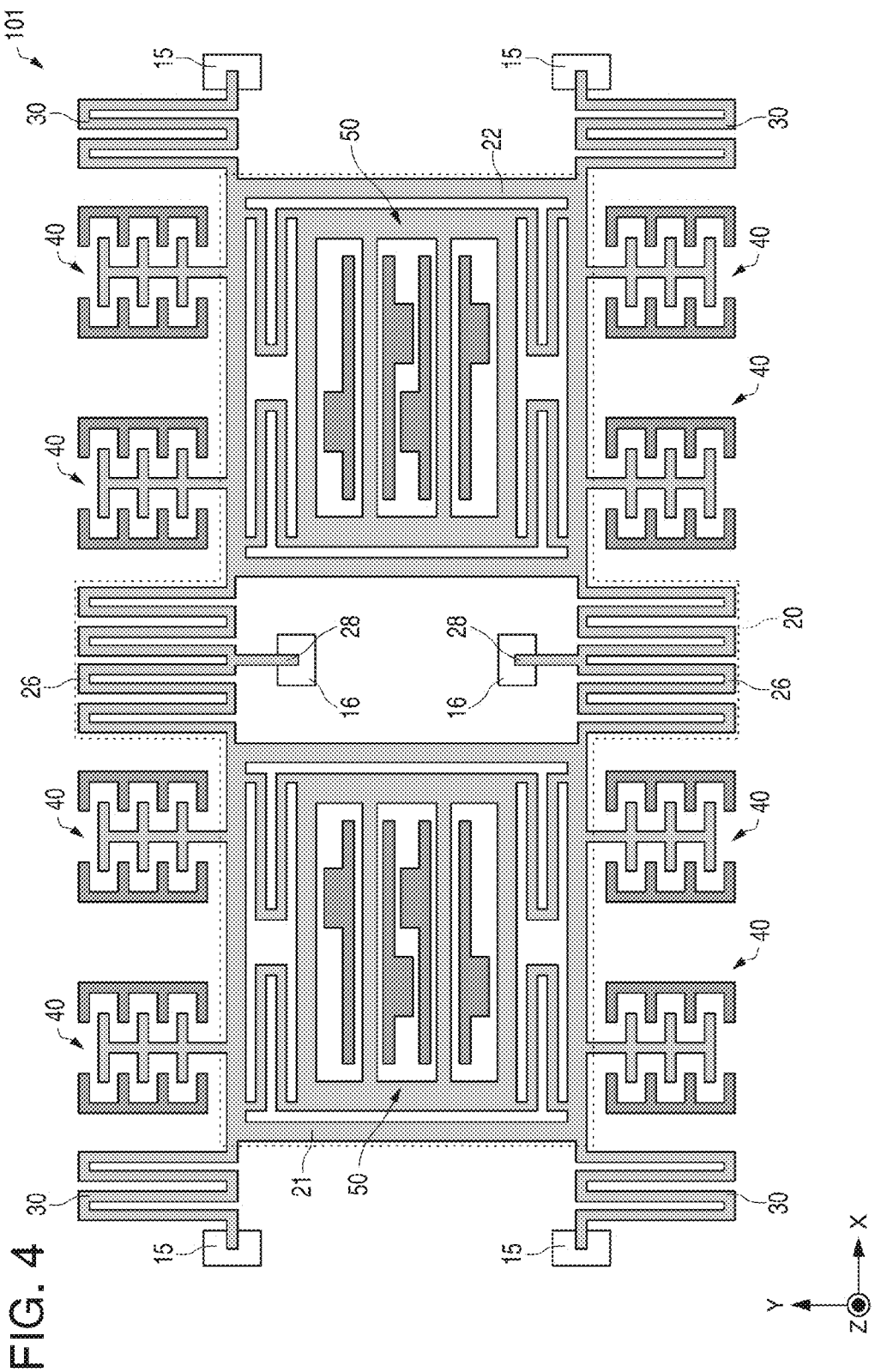
FIG. 4 is a plan view schematically showing a gyro sensor according to a first modified example.

Next, a first modified example of the gyro sensor 100 according to the first embodiment will be explained with reference to the drawings. FIG. 4 is a plan view schematically showing a gyro sensor 101 according to the first modified example. Note that, in FIG. 4, the X-axis, the Y-axis, and the Z-axis are shown as the three axes orthogonal to one another. Further, in FIG. 4, for convenience, illustration of the base 10 and the lid 80 is omitted. As below, in the gyro sensor 101, the members having the same functions as those of the component members of the above described gyro sensor 100 have the same signs and their detailed explanation will be omitted.

In the gyro sensor 101, the vibrator 20 may further have another connecting spring part 26 and another elastic member 28 connecting the first and second vibrating parts 21, 22. In other words, the gyro sensor 101 may further have another pair of the connecting spring part 26 and the elastic member 28.

As the illustrated example, the respective elastic members 28 and second fixing parts 16 may be provided inside of the vibrator 20 (the region between the first vibrating part 21 and the second vibrating part 22). Further, the respective elastic members 28 and second fixing parts 16 may be provided to extend from the connecting spring parts 26 to the outside.

Further, in the illustrated example, four spring parts 30 may be provided in the vibrator 20. Specifically, the two spring parts 30 may be provided on the first vibrating part 21 to be opposed to the center connecting spring part 26 in the X-axis direction. Further, the two spring parts 30 may be provided on the second vibrating part 22 to be opposed to the center connecting spring part 26 in the X-axis direction. Thereby, the vibrator 20 is supported by the four first fixing parts 15 via the spring parts 30.

The gyro sensor 101 according to the first modified example has the same features as those of the gyro sensor 100 according to the first embodiment.

Second Modified Example

Figure 5:
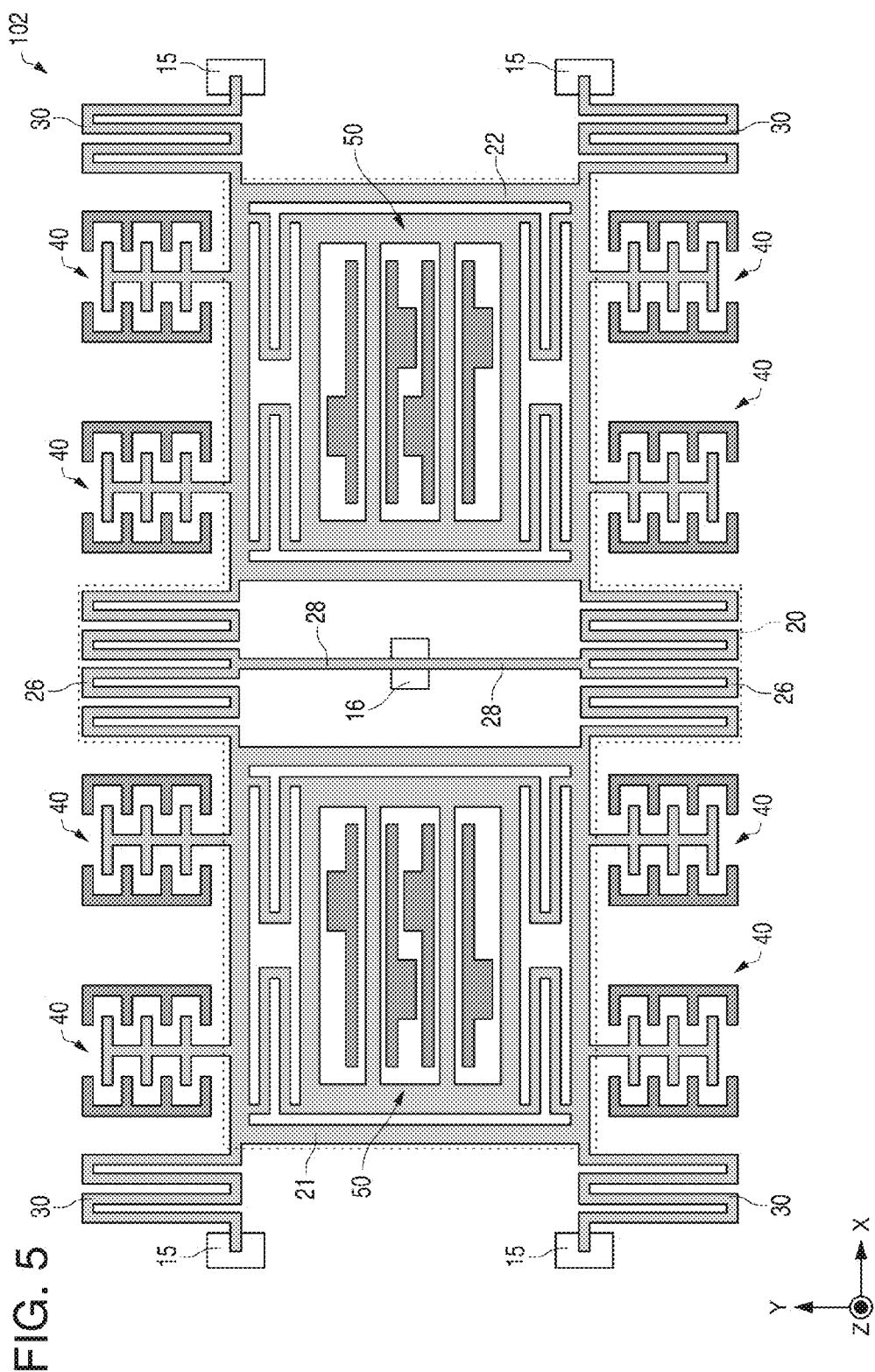
FIG. 5 is a plan view schematically showing a gyro sensor according to a second modified example.

Next, a second modified example of the gyro sensor 100 according to the first embodiment will be explained with reference to the drawings. FIG. 5 is a plan view schematically showing a gyro sensor 102 according to the second modified example. Note that, in FIG. 5, the X-axis, the Y-axis, and the Z-axis are shown as the three axes orthogonal to one another. Further, in FIG. 5, for convenience, illustration of the base 10 and the lid 80 is omitted. As below, in the gyro sensor 102, the members having the same functions as those of the component members of the above described gyro sensor 100 have the same signs and their detailed explanation will be omitted.

In the gyro sensor 102, in the form of the gyro sensor 101, two elastic members 28 are fixed (bonded) to the common second fixing part 16. As illustrated, the two elastic members 28 may be continuous. Further, though not illustrated, the two elastic members 28 may not necessarily be continuous.

The gyro sensor 102 according to the second modified example has the same features as those of the gyro sensor 100 according to the first embodiment. Further, according to the gyro sensor 102, the length L of the elastic member 28 may be provided to be longer, and thus, in the vibration mode of the drive system, the drive frequency of the in-phase mode may be separated from the anti-phase mode, and the influence by the drive frequency of the in-phase mode may be reduced. Therefore, the influence by the in-phase mode on the vibration mode may be suppressed.

Third Modified Example

Figure 6A:
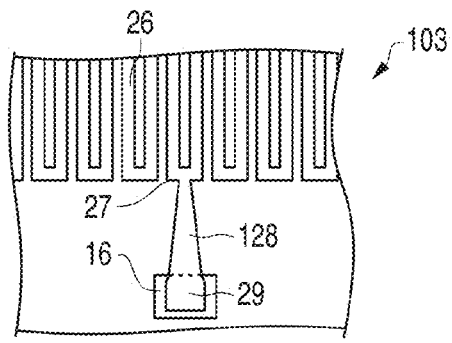
FIGS. 6A to 6C are plan views schematically showing main parts of gyro sensors according to third to fifth modified examples.

Next, a third modified example of the gyro sensor 100 according to the first embodiment will be explained with reference to the drawings. FIG. 6A is a plan view schematically showing a main part of a gyro sensor 103 according to the third modified example. As below, in the gyro sensor 103, the members having the same functions as those of the component members of the above described gyro sensor 100 have the same signs and their detailed explanation will be omitted.

In the gyro sensor 103, an elastic member 128 is not the plate-like member as a rectangular parallelepiped, but has a shape with a width W of the elastic member 128 gradually larger along the direction from the extension position 27 toward the edge part 29. In other words, a width W2 in the edge part 29 of the elastic member 128 is larger than a width W1 in the extension position 27 of the elastic member 128. Though not illustrated, the elastic member 128 may have apart with a fixed width in a predetermined length extending from the extension position 27.

The gyro sensor 103 according to the third modified example has the same features as those of the gyro sensor 100 according to the first embodiment. Further, according to the gyro sensor 103, the area of the edge part 29 fixed (bonded) to the second fixing part 16 may be made larger, and thus, bonding reliability of the elastic member 128 and the second fixing part 16 may be improved. Further, the part of the elastic member 128 at the extension position 27 side is narrower, and thus, the elastic member 128 may be elastically deformed in the X-axis direction.

Note that the gyro sensor 103 according to the third modified example may be applied to the above described gyro sensors 100 to 102 and gyro sensors 104, 105, which will be described later.

Fourth Modified Example

Figure 6B:
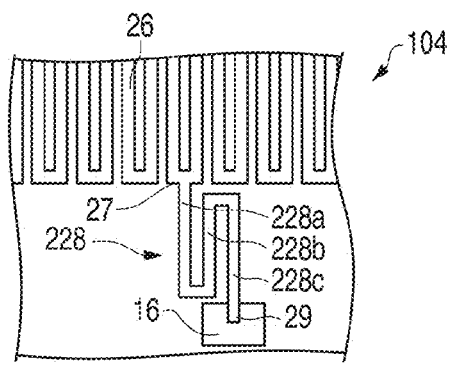

Next, a fourth modified example of the gyro sensor 100 according to the first embodiment will be explained with reference to the drawings. FIG. 6B is a plan view schematically showing a main part of a gyro sensor 104 according to the fourth modified example. As below, in the gyro sensor 104, the members having the same functions as those of the component members of the above described gyro sensor 100 have the same signs and their detailed explanation will be omitted.

In the gyro sensor 104, an elastic member 228 may further have a first extension part 228a extending from the connecting spring part 26 in the direction along the Y-axis and a second extension part 228b folding back from the first extension part 228a and further extending toward the connecting spring part 26 side. Further, the elastic member 228 may further have a third extension part 228c folding back from the second extension part 228b and further extending toward the second fixing part 16 side. In the illustrated example, the elastic member 228 may have an S-shape in the plan view, for example.

The gyro sensor 104 according to the fourth modified example has the same features as those of the gyro sensor 100 according to the first embodiment. Further, according to the gyro sensor 104, the length L of the elastic member 228 may be provided to be longer within the limited design rule, and thus, in the vibration mode of the drive system, the drive frequency of the in-phase mode may be separated from the anti-phase mode, and the influence by the drive frequency of the in-phase mode may be reduced. Therefore, the influence by the in-phase mode on the vibration mode may be suppressed.

Note that the gyro sensor 104 according to the fourth modified example may be applied to the gyro sensors 100 to 102.

Fifth Modified Example

Figure 6C:
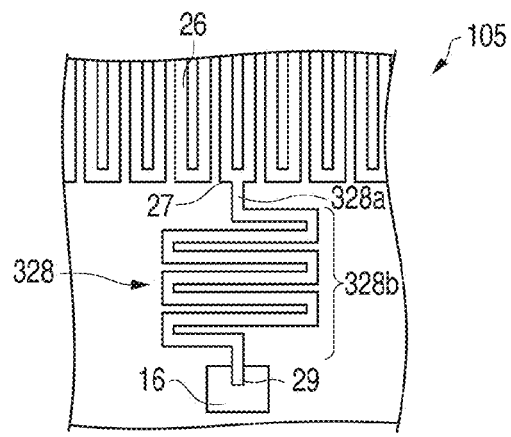

Next, a fifth modified example of the gyro sensor 100 according to the first embodiment will be explained with reference to the drawings. FIG. 6C is a plan view schematically showing a main part of a gyro sensor 105 according to the fifth modified example. As below, in the gyro sensor 105, the members having the same functions as those of the component members of the above described gyro sensor 100 have the same signs and their detailed explanation will be omitted.

In the gyro sensor 105, an elastic member 328 may further have a first extension part 328a extending from the connecting spring part 26 in the direction along the Y-axis and a second extension part 328b extending in the direction along the Y-axis while extending back and forth from the first extension part 328a in the direction along the X-axis.

The gyro sensor 105 according to the fifth modified example has the same features as those of the gyro sensor 100 according to the first embodiment. Further, according to the gyro sensor 105, the length L of the elastic member 328 may be provided to be longer within the limited design rule, and thus, in the vibration mode of the drive system, the drive frequency of the in-phase mode may be separated from the anti-phase mode, and the influence by the drive frequency of the in-phase mode may be reduced. Therefore, the influence by the in-phase mode on the vibration mode may be suppressed.

Note that the gyro sensor 105 according to the fifth modified example may be applied to the gyro sensors 100 to 102.

1-2. Configuration of Gyro Sensor According to Second Embodiment

Figure 7:
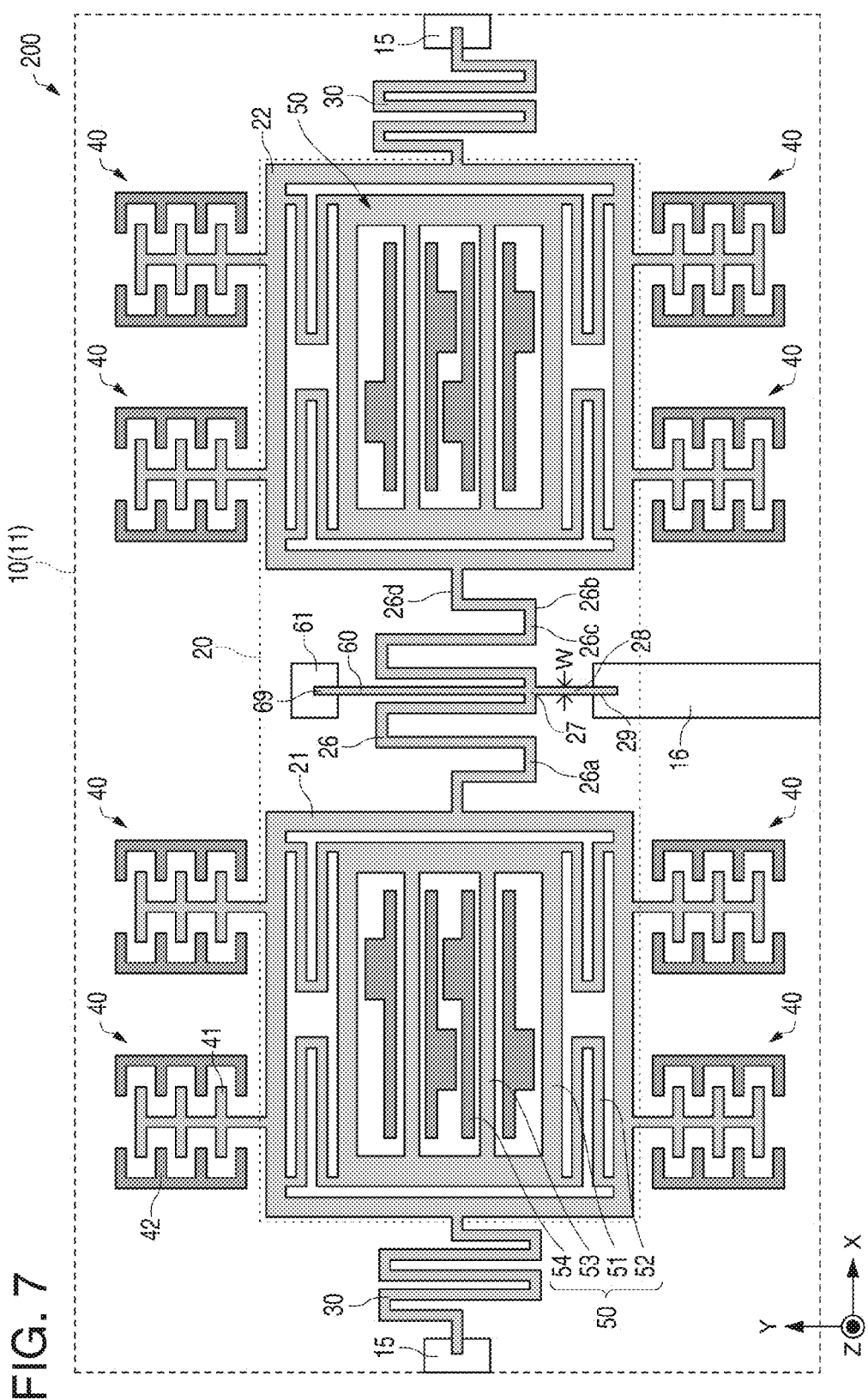
FIG. 7 is a plan view schematically showing a gyro sensor according to a second embodiment.

Next, a gyro sensor 200 according to a second embodiment will be explained with reference to the drawings. FIG. 7 is a plan view schematically showing a main part of the gyro sensor 200 according to the second embodiment. As below, in the gyro sensor 200, the members having the same functions as those of the component members of the above described gyro sensors 100 to 105 have the same signs and their detailed explanation will be omitted.

In the gyro sensor 200, a third fixing part 61 is provided on the base 10, the connecting spring part 26 has a first side surface 26c from which the first elastic member 28 extends and a second side surface 26d opposite to the first side surface 26c, and a second elastic member 60 extending from the second side surface 26d and fixed to the third fixing part 61 is further provided.

Specifically, as shown in FIG. 7, one end of the second elastic member 60 may be connected to the connecting spring part 26 in the extension position 27. Further, the other end (an edge part 69) of the second elastic member 60 may be bonded (fixed) to the third fixing part 61 (the first surface 11 of the base 10).

The shape of the second elastic member 60 is not limited as long as it may be elastically deformed with a predetermined spring constant in the direction along the X-axis (the direction in which the vibrator 20 vibrates). For example, the second elastic member 60 may be an elastic member formed using the same material as that of the first elastic member 28 and having the same features.

Further, through not illustrated, the second elastic member 60 may partially have the same features as those of the elastic members 128, 228, 328 unless it inhibits the expansion and contraction motion of the connecting spring part 26.

Furthermore, through not illustrated, the second elastic member 60 may have a V-shape that branches at the other end (edge part 69) side. In this case, in addition to the third fixing part 61, a fourth fixing part is provided on the base 10 (not shown).

According to the gyro sensor 200 according to the second embodiment, the elastically deformable second elastic member 60 is provided, and thereby, in the vibration mode of the drive system, when a torsional mode is generated, the influence by the torsional mode may be suppressed. Specifically, according to the gyro sensor 200, in the vibration mode of the drive system of the first vibrating part 21 and the second vibrating part 22, the drive frequency of the torsional mode may be separated from the anti-phase mode and its amplitude may be made smaller. The details will be described later.

Here, the torsional mode is a vibration mode of in-plane torsion in which, as seen from the center of the gyro sensor 200, the first and second vibrating parts 21, 22 twist vertically (in the Z-axis direction) while opening in the horizontal direction from each other. The torsional mode is an unintended vibration mode generated due to various design conditions including the entire shape of the gyro sensor, the vibration frequency, etc. Therefore, the shape (width, thickness, length) of the second elastic member 60 is appropriately adjusted so that a desired spring constant for suppressing the torsional mode may be obtained.

Sixth Modified Example

Figure 8:
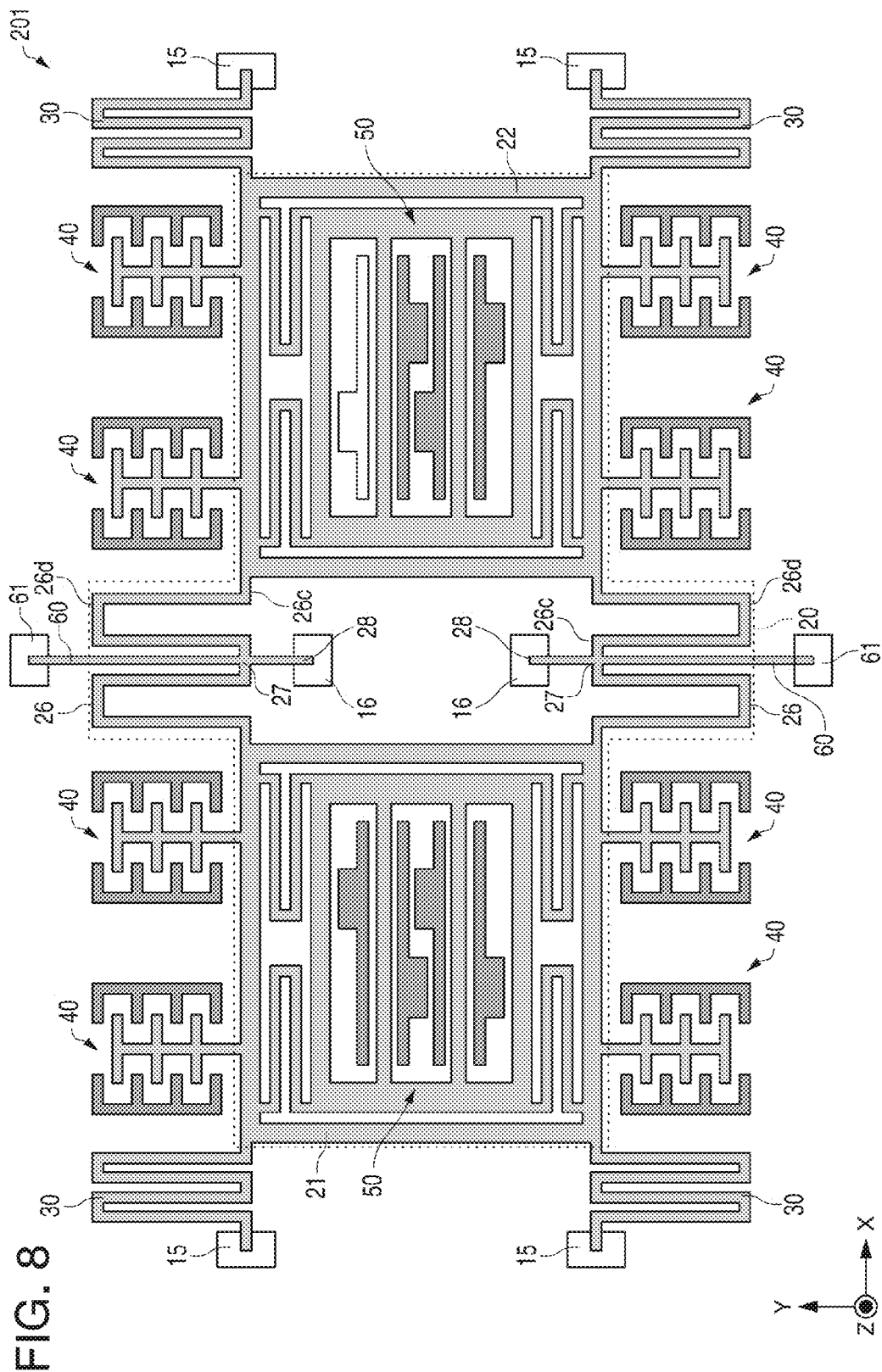
FIG. 8 is a plan view schematically showing a gyro sensor according to a sixth modified example.

Next, a sixth modified example of the gyro sensor 200 according to the second embodiment will be explained with reference to the drawings. FIG. 8 is a plan view schematically showing a main part of a gyro sensor 201 according to the sixth modified example. As below, in the gyro sensor 201, the members having the same functions as those of the component members of the above described gyro sensors 100 to 105, 200 have the same signs and their detailed explanation will be omitted.

The gyro sensor 201 has a form to which the technological features according to the gyro sensor 200 is applied in the gyro sensor 101 further having two pairs of the connecting spring part 26 and the elastic member 28. Specifically, as shown in FIG. 8, each connecting spring part 26 has a first side surface 26c from which the first elastic member 28 extends and a second side surface 26d opposite to the first side surface 26c, and a second elastic member 60 extending from the second side surface 26d and fixed to the third fixing part 61 is further provided.

The gyro sensor 201 according to the sixth modified example may have the same features as those of the gyro sensor 200 according to the second embodiment, and, when the torsional mode is generated, the influence by the torsional mode may be suppressed.

1-3. Movements of Gyro Sensor

Next, movements of the gyro sensors 100 to 105 will be explained with reference to the drawings. FIGS. 9 to 12 are diagrams for schematic explanation of the movements of the gyro sensors 100 to 105. Here, in FIGS. 9 to 12, the movement of the gyro sensor according to the embodiment of the invention is exemplified by the form of the gyro sensor 101. Note that, in FIGS. 9 to 12, the X-axis, the Y-axis, and the Z-axis are shown as the three axes orthogonal to one another. Further, in FIGS. 9 to 12, the respective configurations of the gyro sensor 101 are simplified.

As described above, in the vibration mode of the gyro sensor 101 (100, 102 to 105), the first vibrating part 21 and the second vibrating part 22 are excited by the drive parts 40 and may drive-vibrate in anti-phase (opposite phase) with each other. More specifically, a first alternating voltage is applied between the driving movable electrode part 41 and the driving fixed electrode part 42 provided on the first vibrating part 21 and a second alternating voltage out of phase by 180 degrees with the first alternating voltage is applied between the driving movable electrode part 41 and the driving fixed electrode part 42 of the second vibrating part 22. Thereby, the first vibrating part 21 and the second vibrating part 22 may be vibrated along the X-axis at a predetermined frequency in anti-phase (opposite phase) with each other. That is, the first vibrating part 21 and the second vibrating part 22 connected to each other along the X-axis vibrate in anti-phase with each other along the X-axis. That is, the first vibrating part 21 and the second vibrating part 22 are displaced in opposite directions to each other along the X-axis.

Figure 9:
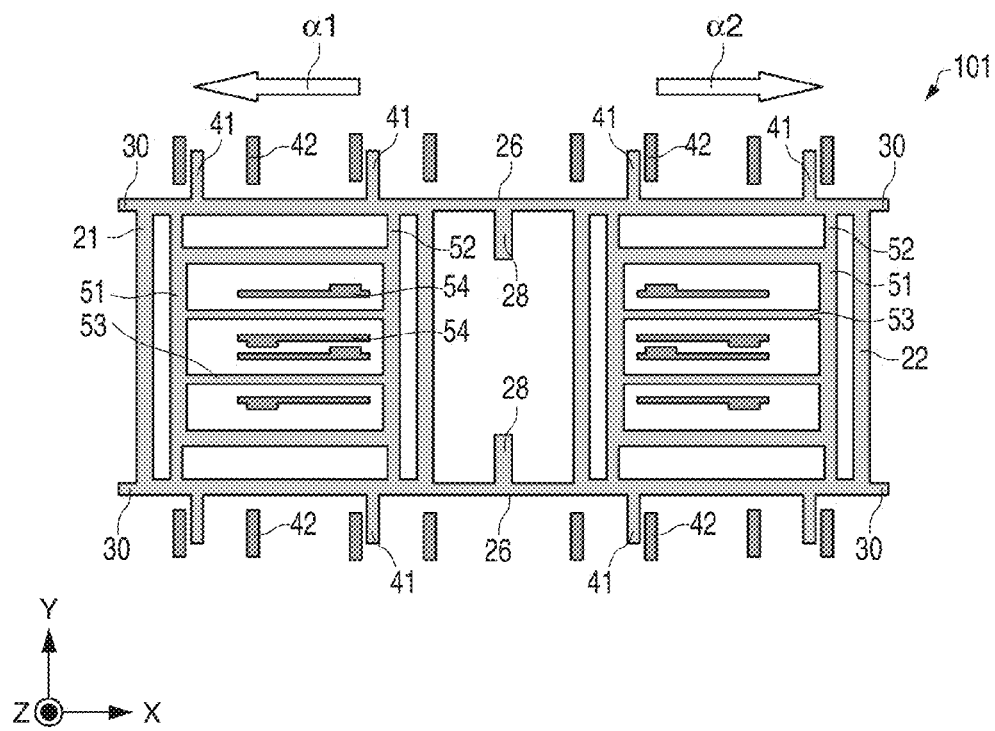
FIG. 9 is a plan view for explanation of a movement of the gyro sensor according to the embodiment.
Figure 10:
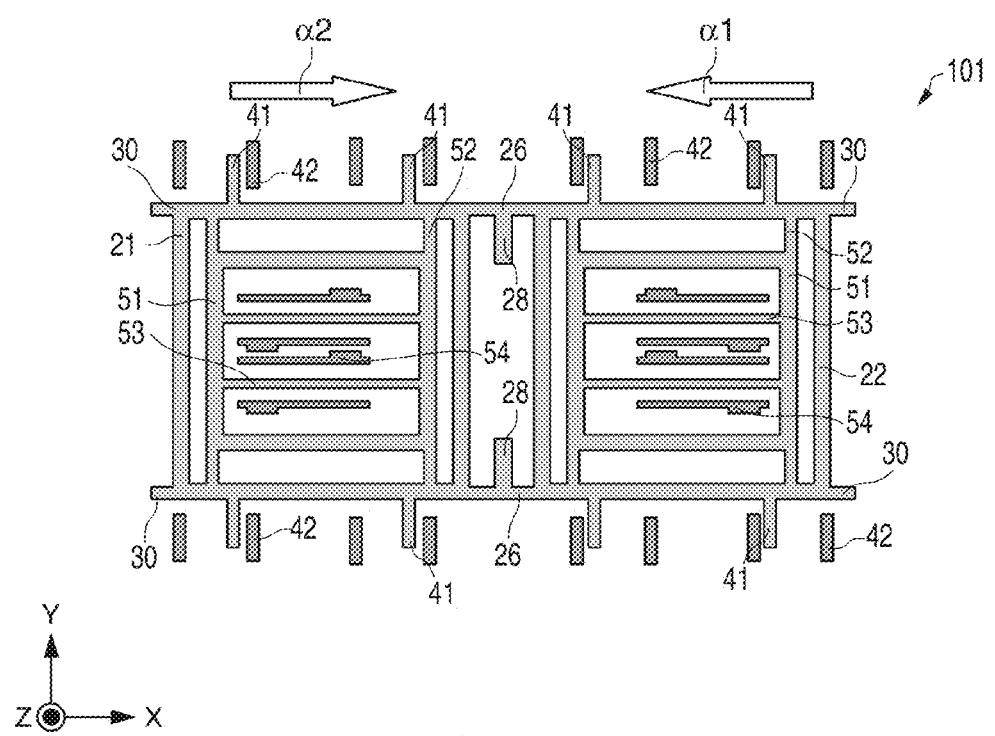
FIG. 10 is a plan view for explanation of a movement of the gyro sensor according to the embodiment.

In the example shown in FIG. 9, the first vibrating part 21 is displaced in α1-direction (−X-axis direction) and the second vibrating part 22 is displaced in α2-direction (+X-axis direction) opposite to the α1-direction. In the example shown in FIG. 10, the first vibrating part 21 is displaced in the α2-direction and the second vibrating part 22 is displaced in the α1-direction.

Note that the parts of the detection parts 50 connected to the vibrator 20 (the first vibrating part 21 and the second vibrating part 22) are displaced along the X-axis with the vibration of the vibrator 20 (the first vibrating part 21 and the second vibrating part 22).

Figure 11:
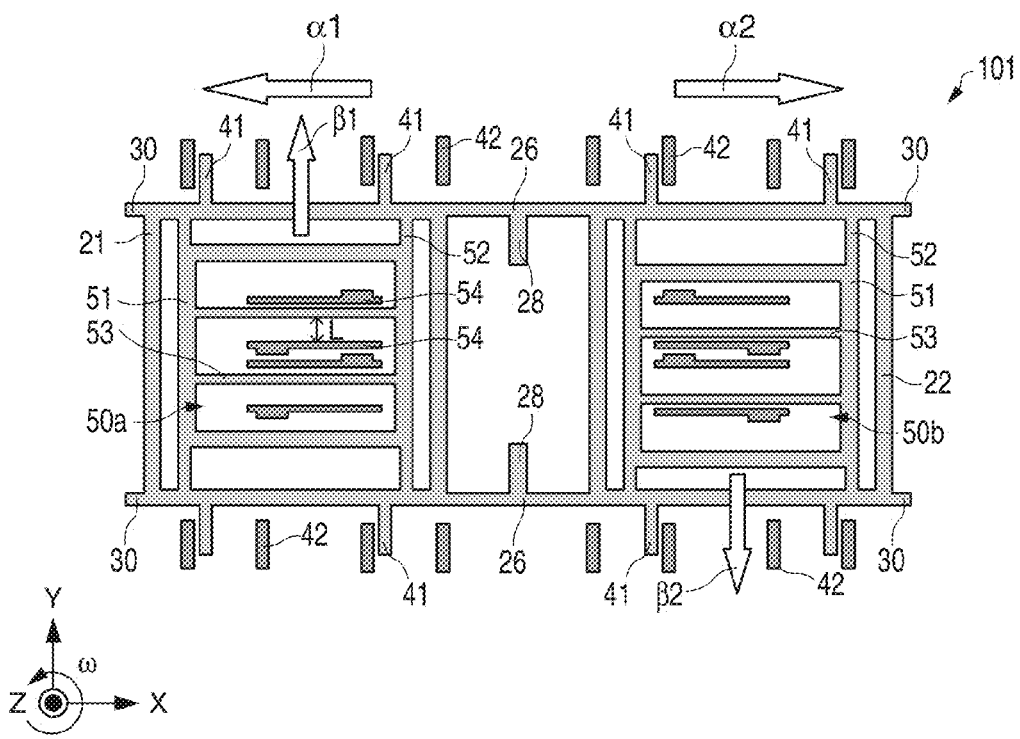
FIG. 11 is a plan view for explanation of a movement of the gyro sensor according to the embodiment.
Figure 12:
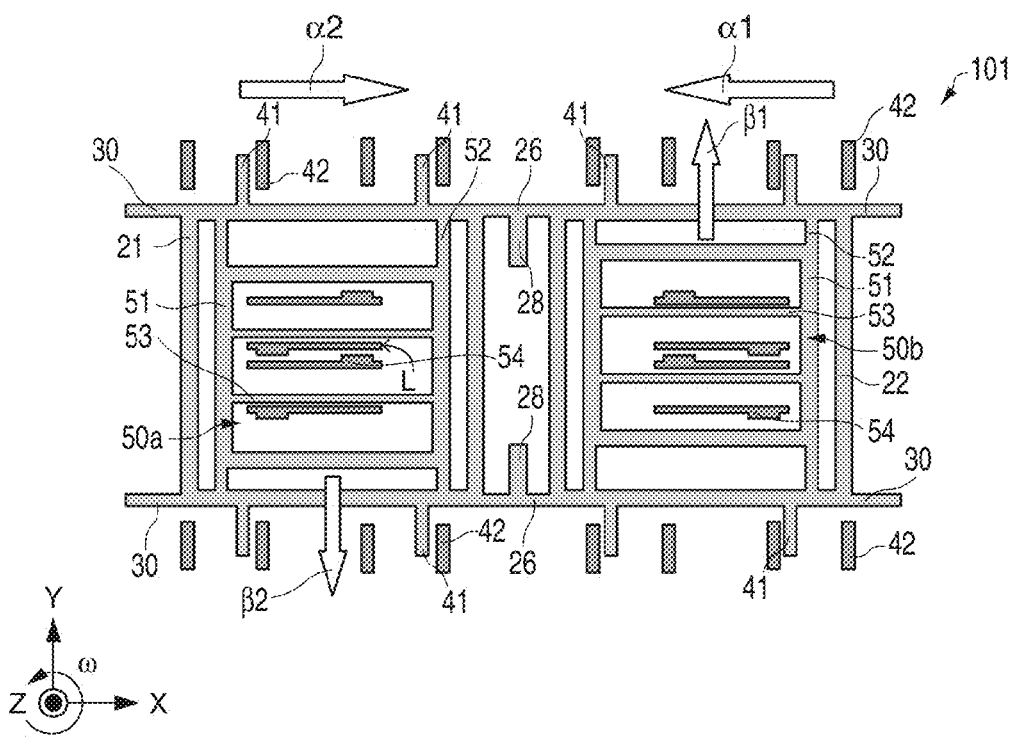
FIG. 12 is a plan view for explanation of a movement of the gyro sensor according to the embodiment.

As shown in FIGS. 11 and 12, under the condition that the first vibrating part 21 and the second vibrating part 22 vibrate along the X-axis, when an angular velocity ω around the Z-axis is applied to the gyro sensor 101 (100, 102 to 105), Coriolis force acts and the detection parts 50 are displaced along the Y-axis. That is, a first detection part 50a connected to the first vibrating part 21 and a second detection part 50b connected to a second drive part 110b are displaced along the Y-axis in opposite directions to each other. In the example shown in FIG. 11, the first detection part 50a is displaced in β1-direction and the second detection part 50b is displaced in β2-direction opposite to the β1-direction. In the example shown in FIG. 12, the first detection part 50a is displaced in the β2-direction and the second detection part 50b is displaced in the β1-direction.

The detection parts 50a, 50b are displaced along the Y-axis, and thereby, the distance L between the detection movable electrode part 53 and the detection fixed electrode part 54 changes. Accordingly, the capacitance between the detection movable electrode part 53 and the detection fixed electrode part 54 changes. In the gyro sensor 101 (100, 102 to 105), a voltage is applied to the detection movable electrode part 53 and the detection fixed electrode part 54, and thereby, the amount of change of the capacitance between the detection movable electrode part 53 and the detection fixed electrode part 54 may be detected and the angular velocity ω around the Z-axis may be obtained.

According to the gyro sensor 101 (100, 102 to 105), the elastic member 28 is provided in the connecting spring part 26, and thus, in the vibration mode, the influence by the in-phase mode may be reduced. Thereby, the gyro sensor may achieve the desired vibration frequency, and the reliability of the gyro sensor may be improved. The details will be described later.

2. Working Examples

Next, simulation results according to working examples will be explained. In the simulations, the vibration frequencies were calculated by the finite element method. The base model of the simulations according to the working examples was the form of the gyro sensor 101 according to the first modified example. In the following working examples, vibration frequencies of vibrators when the elastic members according to the gyro sensors 104, 105 were applied to the base model were simulated. As physical property conditions of the component members, the Young's modulus of 130.18 GPa and the cross-sectional area of 50 μm$^2$ were used.

Further, the respective members such as the spring parts of the actual gyro sensor have variations (errors) in the shape (dimensions) inevitably caused in the manufacturing process. Therefore, in the working examples, a dimension error of 0.17 μm is provided between the spring part 30 connected to the first vibrating part 21 and the spring part 30 connected to the second vibrating part 22.

First Working Example

As a simulation condition according to the first working example, simulations were performed with the gyro sensor 101 in the form shown in FIG. 4 including the elastic member 28 with the respective spring parts 30 in three turns (three folds) and the connecting spring parts 26 in six turns (six folds). The vibration frequency f in the form was 4.7 kHz.

In the first working example, simulations were performed in the respective conditions with the length of the elastic member 28 fixed to 100 μm, and the width changed to 12 μm, 6 μm, 3 μm, 1 μm, 0.12 μm, and 0.01 μm.

Table 1 shows the simulation results in the respective widths of the first working example.

TABLE 1

| Width of elastic member [μm] | Frequency of in-phase mode [Hz] | Frequency of anti-phase mode [Hz] | Δf [kHz] |
|---|---|---|---|
| 12 | 4533.1 | 4684.7 | 0.15 |
| 6 | 4354.9 | 4679.5 | 0.32 |
| 3 | 3961.4 | 4678.7 | 0.72 |
| 1 | 3557.3 | 4678.7 | 1.12 |
| 0.12 | 3196 | 4678.3 | 1.48 |
| 0.01 | 3194.4 | 4678.3 | 1.48 |

Figure 13:
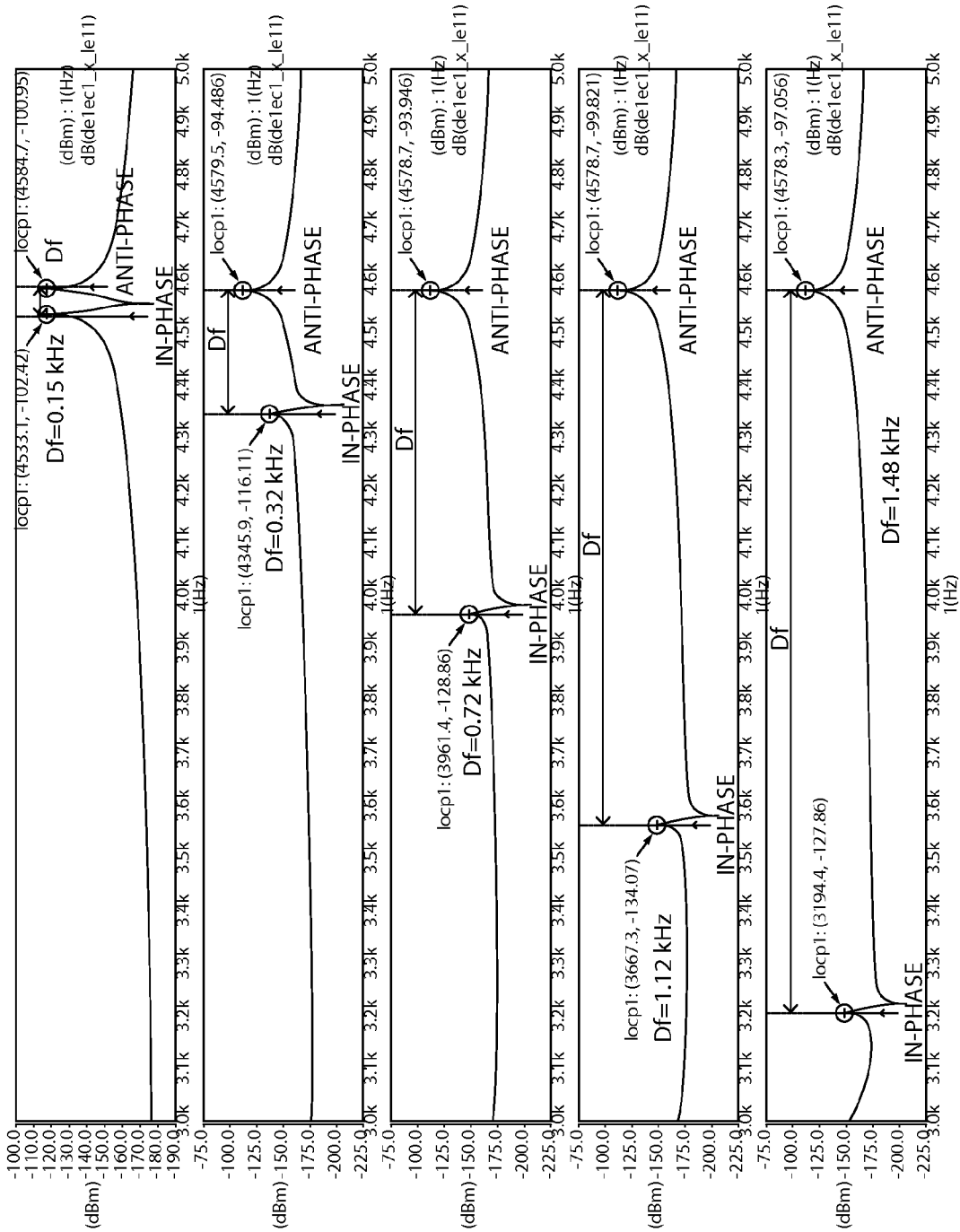
FIGS. 13A to 13E show simulation results according to a first working example.

Further, FIGS. 13A to 13E show simulation results according to the first working example. FIG. 13A shows the simulation result with the width of 12 μm, FIG. 13B shows the simulation result with the width of 6 μm, FIG. 13C shows the simulation result with the width of 3 μm, FIG. 13D shows the simulation result with the width of 1 μm, and FIG. 13E shows the simulation result with the width of 0.01 μm. Note that the horizontal axis indicates the frequency (Hz) and the vertical axis indicates a logarithmic scale obtained by logarithmic transformation of an amount of displacement (dBm).

As shown in FIG. 13A, by providing the elastic member 28, the difference Δf in frequency between the in-phase mode and the anti-phase mode may be 0.15 kHz. That is, by providing the elastic member 28, the frequency of the in-phase mode may be separated from the frequency of the anti-phase mode by Δf. Therefore, according to the embodiment of the invention, it has been confirmed that the influence by the in-phase mode on the vibration mode of the drive system is suppressed.

Further, from Table 1 and FIGS. 13A to 13E, as the width of the elastic member 28 is smaller from 12 μm to 0.01 μm, the difference Δf in frequency between the in-phase mode and the anti-phase mode may be made larger. That is, it has been confirmed that, if the width of the elastic member is made smaller in a range from 12 μm to 0.01 μm, the frequency of the in-phase mode may be further separated from the frequency of the anti-phase mode, and the influence by the in-phase mode on the vibration mode of the drive system is further suppressed.

Figure 14:
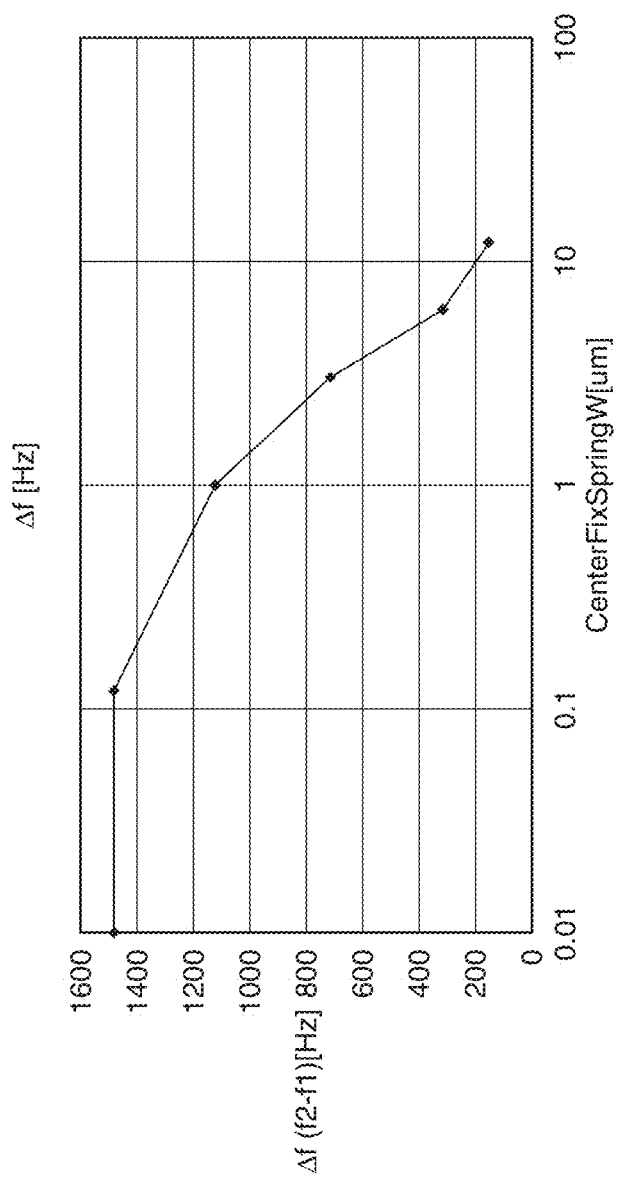
FIG. 14 shows a simulation result according to the first working example.

Here, FIG. 14 is a graph in which the horizontal axis indicates the width of the elastic member [μm] and the vertical axis indicates the difference Δf [Hz] in frequency between the anti-phase mode and the in-phase mode obtained by logarithmic transformation and plotted. As shown in FIG. 14, by setting the width of the elastic member in the range from 12 μm to 0.12 μm, the difference between the frequency of the anti-phase mode and the frequency of the in-phase mode may be effectively controlled.

Second Working Example

As a simulation condition according to the second working example, simulations were performed in the form in which the elastic member 328 of the gyro sensor 105 is applied to the gyro sensor 101 in the form shown in FIG. 4 with the respective spring parts 30 in three turns, the connecting spring parts 26 in six turns, and the elastic member 328 in five turns. The vibration frequency f in the form was 4.7 kHz.

In the second working example, the simulations were performed under the condition that the width of the elastic member 328 is 4 μm and the length is 100 μm.

Figure 15:
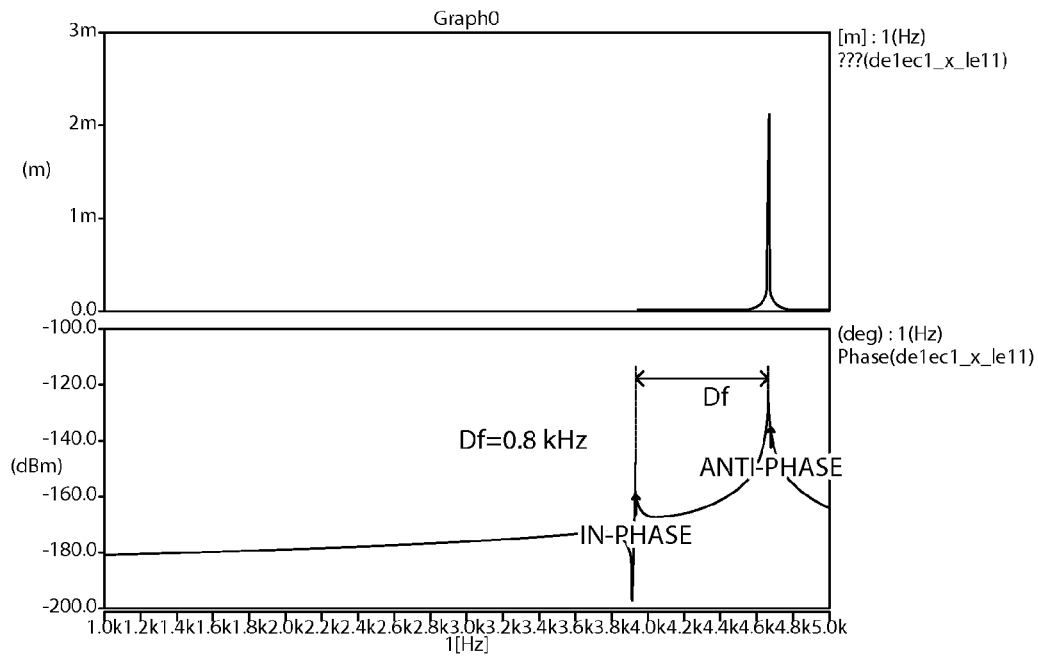
FIG. 15 shows a simulation result according to a second working example.

FIG. 15 shows a simulation result according to the second working example. The horizontal axis indicates the frequency (Hz) and the vertical axis indicates the amount of displacement (dBm). The scale of the vertical axis of the upper graph in FIG. 15 is an absolute value and the vertical axis of the lower graph is the logarithmic scale obtained by logarithmic transformation of the amount of displacement. As below, the same applies to FIGS. 16 to 18.

As shown in FIG. 15, the difference Δf in frequency between the in-phase mode and the anti-phase mode was 0.8 kHz. Therefore, by providing the elastic member 328 for which the length L may be set to be longer than that of the elastic member 28 of the first working example, the frequency of the in-phase mode may be separated from the frequency of the anti-phase mode. Therefore, according to the embodiment of the invention, it has been confirmed that the influence by the in-phase mode on the vibration mode of the drive system is suppressed.

Third Working Example

As a simulation condition according to the third working example, simulations were performed in the form in which the elastic member 328 of the gyro sensor 105 is applied to the gyro sensor 101 in the form shown in FIG. 4 with the respective spring parts 30 in six turns, the connecting spring parts 26 in six turns, and the elastic member 328 in five turns. The vibration frequency f in the form was 4.0 kHz.

In the third working example, the simulations were performed under the condition that the width of the elastic member 328 is 4 μm and the length is 100 μm.

Figure 16:
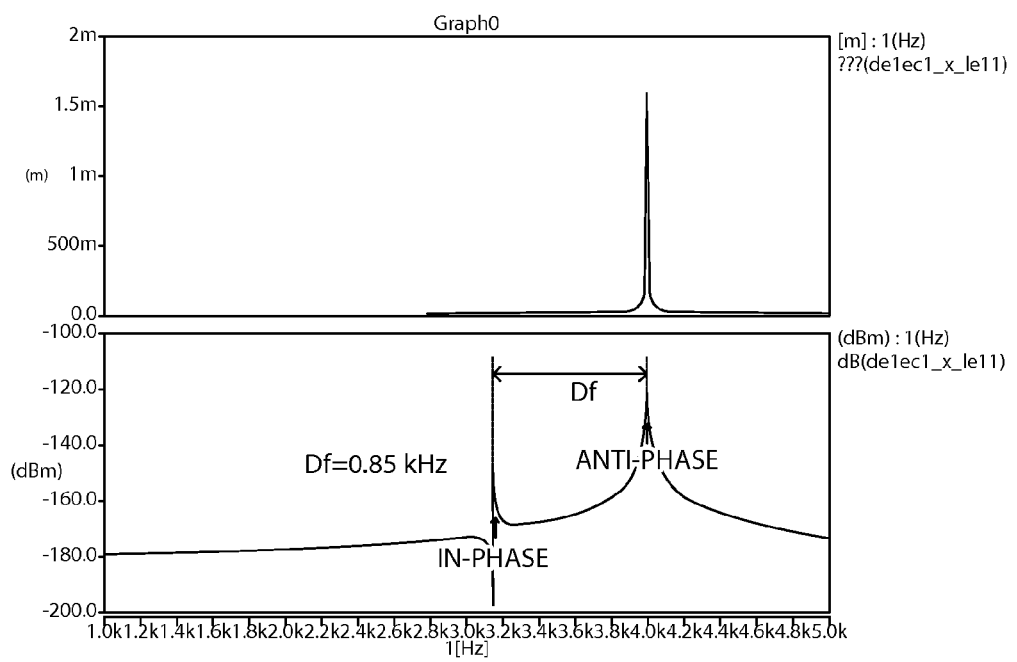
FIG. 16 shows a simulation result according to a third working example.

FIG. 16 shows a simulation result according to the third working example. As shown in FIG. 16, the difference Δf in frequency between the in-phase mode and the anti-phase mode was 0.85 kHz. Therefore, by providing the elastic member 328 for which the length L may be set to be longer than that of the second working example, the frequency of the in-phase mode may be separated from the frequency of the anti-phase mode. Therefore, according to the embodiment of the invention, it has been confirmed that the influence by the in-phase mode on the vibration mode of the drive system is suppressed.

Fourth Working Example

As a simulation condition according to the fourth working example, simulations were performed in the form in which the elastic member 228 of the gyro sensor 104 is applied to the gyro sensor 101 in the form shown in FIG. 4 with the respective spring parts 30 in six turns, the connecting spring parts 26 in six turns, and the elastic member 228 in 1.5 turns. The vibration frequency f in the form was 4.0 kHz.

In the fourth working example, the simulations were performed under the condition that the width of the elastic member 228 is 4 μm and the length is 100 μm.

Figure 17:
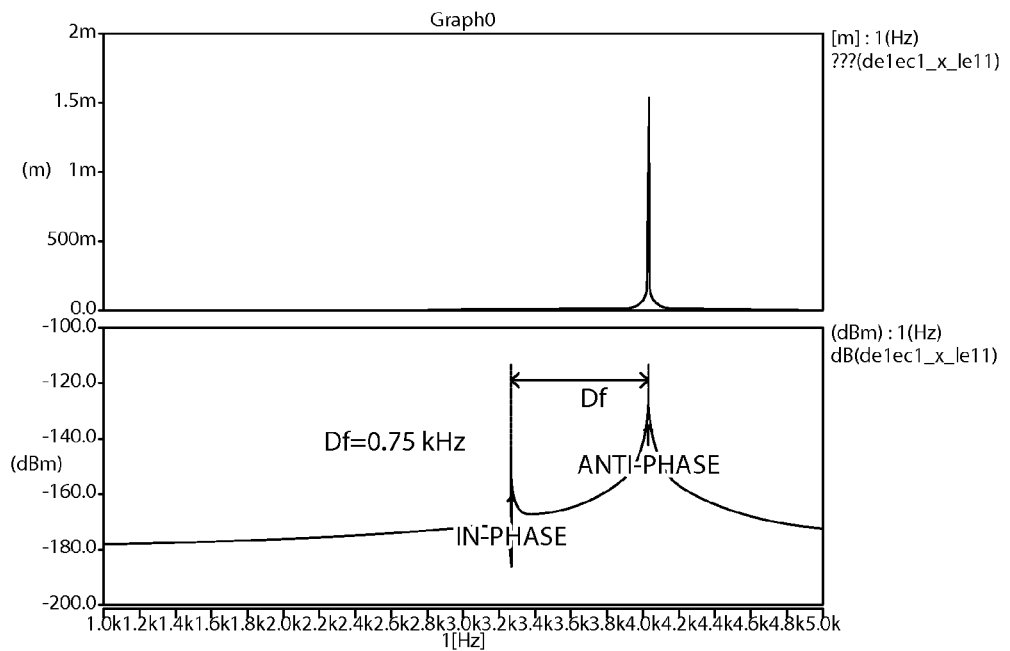
FIG. 17 shows a simulation result according to a fourth working example.

FIG. 17 shows a simulation result according to the fourth working example. As shown in FIG. 17, the difference Δf in frequency between the in-phase mode and the anti-phase mode was 0.75 kHz. Therefore, by providing the elastic member 228 for which the length L may be set to be longer than that of the first working example, the frequency of the in-phase mode may be separated from the frequency of the anti-phase mode. Therefore, according to the embodiment of the invention, it has been confirmed that the influence by the in-phase mode on the vibration mode of the drive system is suppressed.

Fifth Working Example

As a simulation condition according to the fifth working example, in the simulation condition of the fourth working example, the length of the elastic member 228 in the Y-axis direction was made twice. The vibration frequency f in the form was 4.0 kHz.

Figure 18:
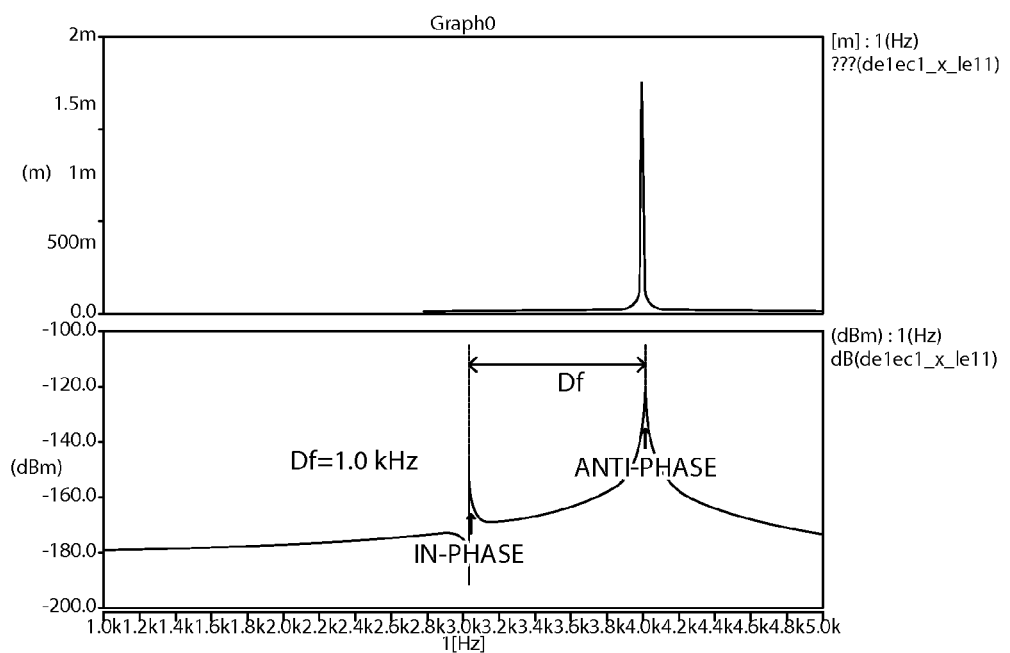
FIG. 18 shows a simulation result according to a fifth working example.

FIG. 18 shows a simulation result according to the fifth working example. As shown in FIG. 18, the difference Δf in frequency between the in-phase mode and the anti-phase mode was 1.0 kHz. Therefore, by setting the length L of the elastic member 228 to be longer, the frequency of the in-phase mode may be separated from the frequency of the anti-phase mode. Therefore, according to the embodiment of the invention, it has been confirmed that the influence by the in-phase mode on the vibration mode of the drive system is suppressed.

Next, simulations were performed using the form according to the gyro sensor 201 according to the second embodiment under the following conditions.

Comparative Example

A simulation model according to a comparative example was in the form of the gyro sensor 101 in the form shown in FIG. 4 with the respective spring parts 30 in two turns (two folds) and the connecting spring parts 26 in four turns (four folds). Further, the elastic member was in the form of the elastic member 328 according to the gyro sensor 105 in five turns (five folds).

Figure 19:
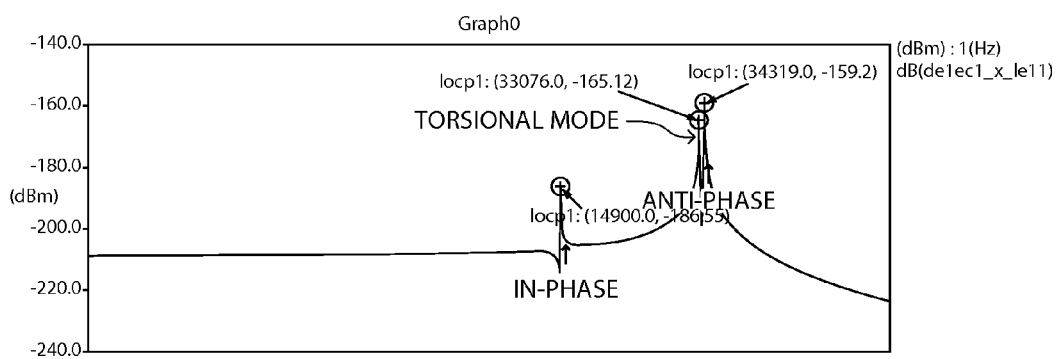
FIG. 19 shows a simulation result according to a comparative example.

FIG. 19 shows a simulation result according to the comparative example. The horizontal axis indicates the frequency (Hz) and the vertical axis indicates the amount of displacement (dBm) in the logarithmic scale.

As shown in FIG. 19, in the gyro sensor in the form according to the comparative example, it has been confirmed that the torsional mode close to the anti-phase mode is generated at the in-phase mode side.

Sixth Working Example

As a simulation condition according to the sixth working example, in the simulation condition of the comparative example, the second elastic member 60 applied to the gyro sensors 200, 201 according to the second embodiment was further applied. As a specific form of the second elastic member 60, an elastic member having the same form as that of the plate-like first elastic member shown in FIG. 1 was applied.

Figure 20A:
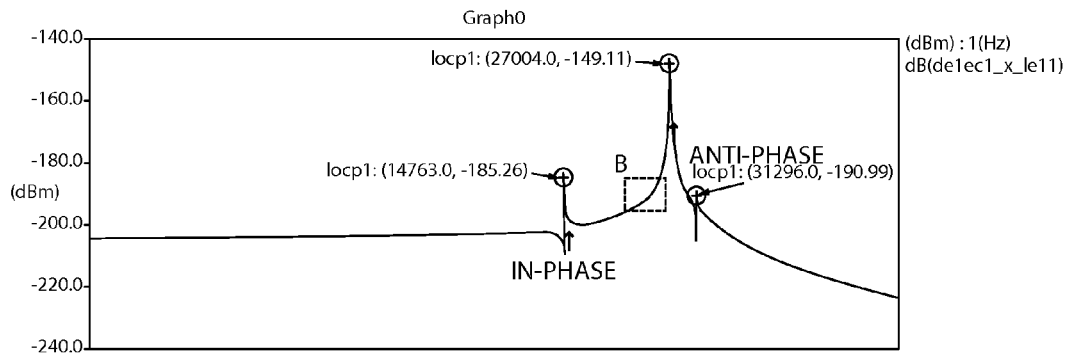
FIGS. 20A and 20B show simulation results according to a sixth working example.
Figure 20B:
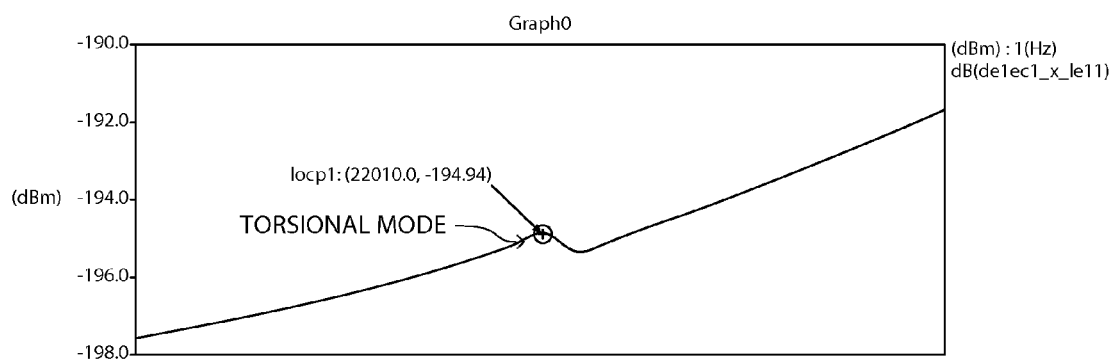

FIG. 20A shows a simulation result according to the sixth working example, and FIG. 20B is an enlarged view of a dotted line part B in FIG. 20A. As shown in FIGS. 20A and 20B, by providing the second elastic member 60 according to the second embodiment, the peak of the frequency that exhibits the torsional mode may be separated from the frequency of the anti-phase mode. Further, by providing the elastic member 60, the amplitude of the torsional mode may be remarkably made smaller. Therefore, according to the embodiment of the invention, it has been confirmed that the influence by the torsional mode on the vibration mode of the drive system is further suppressed.

3. Manufacturing Method of Gyro Sensor

Figure 22:
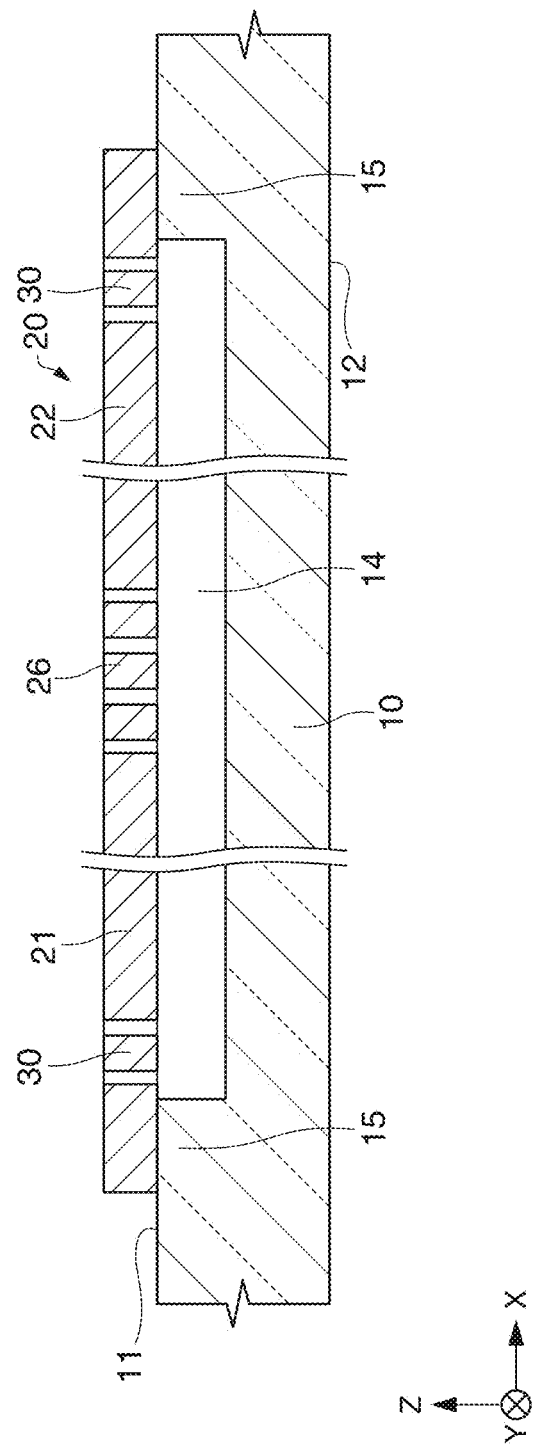
FIG. 22 is a sectional view schematically showing a manufacturing step of the gyro sensor according to the embodiment.

Next, a manufacturing method of the gyro sensor according to the embodiment will be explained with reference to the drawings. FIGS. 21 and 22 are sectional views schematically showing manufacturing steps of the gyro sensor 100 according to the embodiment, and correspond to FIG. 2.

As shown in FIG. 21, the concave part 14 is formed on the first surface of the base 10. In this regard, a groove part (not shown) may be formed around the concave part 14. The concave part 14 and the groove part are formed by a photolithography technology and an etching technology, for example. Thereby, the base 10 with the concave part 14 provided on the first surface 11 may be prepared.

Then, though not illustrated, wires for forming the drive parts 40 and the detection parts 50 may be formed on the base 10 including the inside of the concave part 14. For example, the wires are formed by deposition using sputtering, CVD (Chemical Vapor Deposition), or the like, and then, patterning using a photolithography technology and an etching technology.

As shown in FIG. 22, the vibrator 20, the spring parts 30, etc. are formed on the base 10. More specifically, a silicon substrate (not shown) is placed (bonded) on the first surface 11 of the base 10, the silicon substrate is made thinner and patterned, and thereby, they are formed. The patterning is performed by a photolithography technology and an etching technology. Bonding of the silicon substrate and the base 10 is performed by anodic bonding, for example.

At the step, the driving fixed electrode parts 42, detection fixed electrode parts 54, etc. may be formed on the first surface 11, and the drive parts 40 and the detection parts 50 may be formed.

As shown in FIG. 2, the base 10 and the lid 80 are bonded and the vibrator 20 is housed in the cavity 82 surrounded by the base 10 and the lid 80. Bonding of the base 10 and the lid 80 is performed by anodic bonding, for example.

The gyro sensor 100 may be manufactured in the above described process.

4. Electronic Apparatus

Next, an electronic apparatus according to the embodiment will be explained with reference to the drawings. The electronic apparatus according to the embodiment includes the gyro sensor according to the embodiment of the invention. As below, an electronic apparatus including the gyro sensor 100 (or one of 101, 102, 103, 104, 105) as the gyro sensor according to the embodiment of the invention will be explained.

Figure 23:
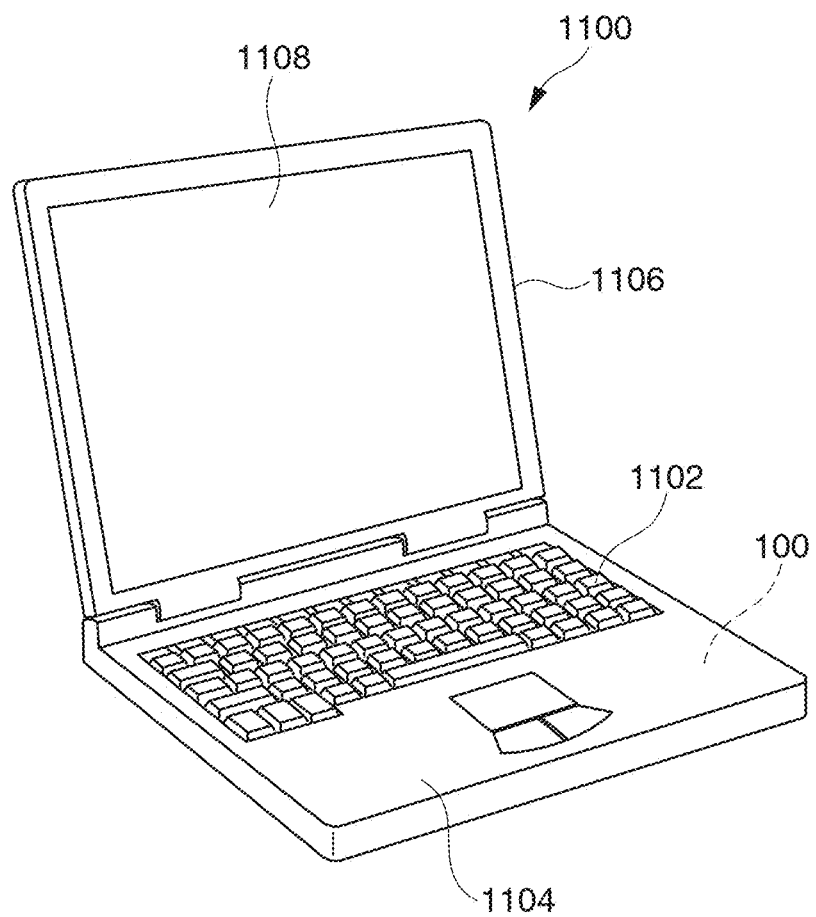
FIG. 23 is a perspective view schematically showing an electronic apparatus.

FIG. 23 is a perspective view schematically showing a mobile (or notebook) personal computer 1100 as the electronic apparatus according to the embodiment.

As shown in FIG. 23, the personal computer 1100 includes a main body unit 1104 having a keyboard 1102 and a display unit 1106 having a display part 1108, and the display unit 1106 is rotatably supported via a hinge structure part with respect to the main body unit 1104.

The personal computer 1100 contains the gyro sensor 101.

Figure 24:
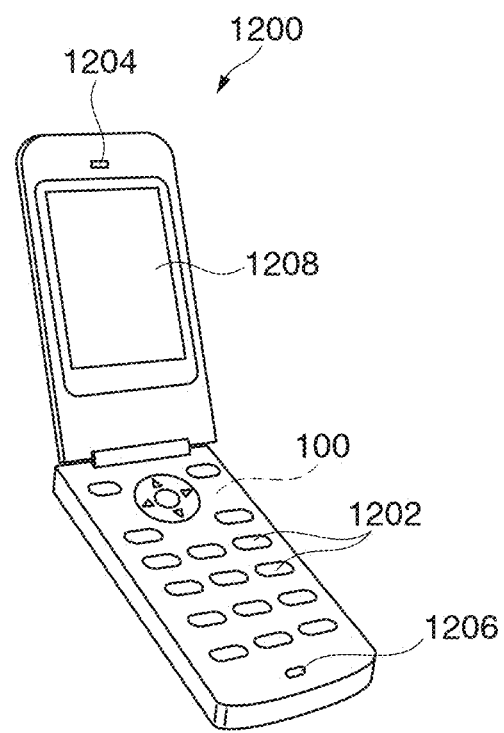
FIG. 24 is a perspective view schematically showing an electronic apparatus.

FIG. 24 is a perspective view schematically showing a cellular phone (including a PHS) 1200 as the electronic apparatus according to the embodiment.

As shown in FIG. 24, the cellular phone 1200 includes a plurality of operation buttons 1202, an ear piece 1204, and a mouthpiece 1206, and a display part 1208 is provided between the operation buttons 1202 and the ear piece 1204.

The cellular phone 1200 contains the gyro sensor 100 (or one of 101, 102, 103, 104, 105).

Figure 25:
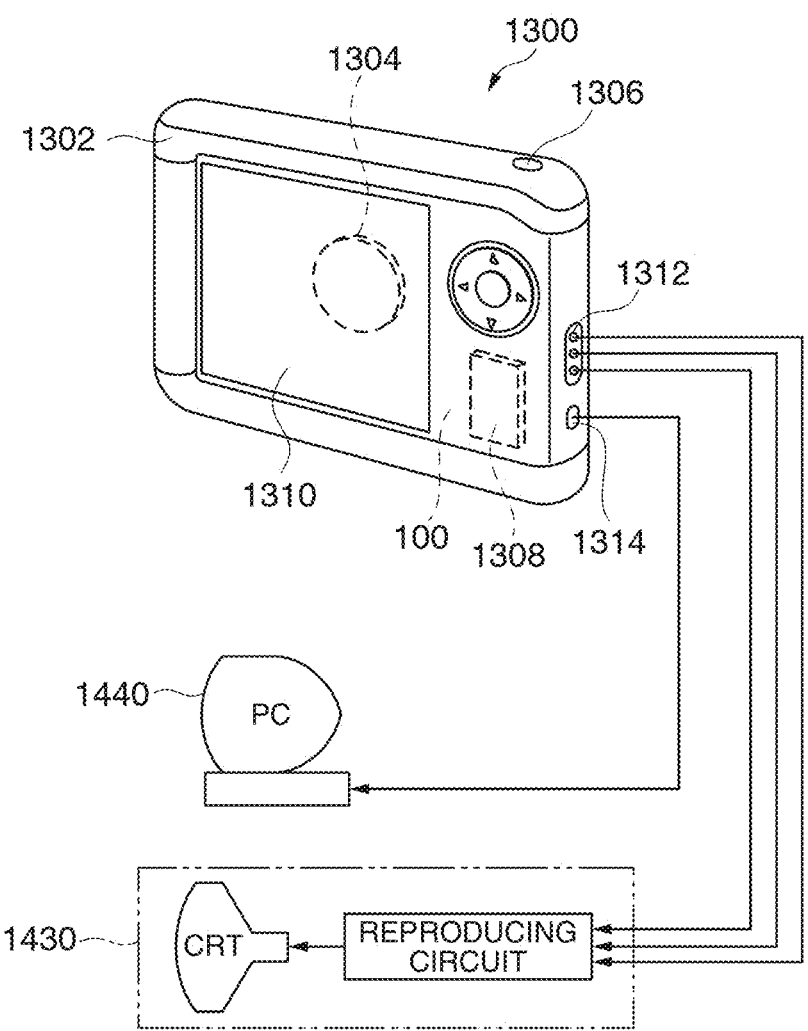
FIG. 25 is a perspective view schematically showing an electronic apparatus.

FIG. 25 is a perspective view schematically showing a digital still camera 1300 as the electronic apparatus according to the embodiment. Note that, in FIG. 25, connection to an external device is simply shown.

Here, in a typical camera, a silver halide photographic film is exposed to light by an optical image of a subject and, on the other hand, the digital still camera 1300 photoelectrically converts an optical image of a subject using an image sensing device such as a CCD (Charge Coupled Device) and generates imaging signals (image signals).

On a back surface of a case (body) 1302 in the digital still camera 1300, a display part 1310 is provided and adapted to display based on the imaging signals by the CCD, and the display part 1310 functions as a finder that displays the subject as an electronic image.

Further, on the front side (the rear side in the drawing) of the case 1302, a light receiving unit 1304 including an optical lens (imaging system), the CCD, etc. is provided.

When a photographer checks the subject image displayed on the display part 1310 and presses down a shutter button 1306, the imaging signals of the CCD at the time are transferred and stored into a memory 1308.

Further, in the digital still camera 1300, video signal output terminals 1312 and an input/output terminal for data communication 1314 are provided on the side surface of the case 1302. Furthermore, a television monitor 1430 is connected to the video signal output terminals 1312 and a personal computer 1440 is connected to the input/output terminal for data communication 1314, respectively, according to need. In addition, by predetermined operation, the imaging signals stored in the memory 1308 are output to the television monitor 1430 and the personal computer 1440.

The digital still camera 1300 contains the gyro sensor 100 (or one of 101, 102, 103, 104, 105).

The above described electronic apparatus 1100, 1200, 1300 may have the gyro sensor 100 (or one of 101, 102, 103, 104, 105) that may prevent sticking without inhibiting the vibration energy exchange between each other in the drive system in which two vibrators vibrate in anti-phase.

Note that the electronic apparatus including the above described gyro sensor 100 (or one of 101, 102, 103, 104, 105) may be applied not only to the personal computer (mobile personal computer) shown in FIG. 23, the cellular phone shown in FIG. 24, and the digital still camera shown in FIG. 25 but also to an inkjet ejection device (for example, an inkjet printer), a laptop personal computer, a television, a video camera, a head mounted display, a video tape recorder, various navigation systems, a pager, a personal digital assistance (with or without communication function), an electronic dictionary, a calculator, an electronic game machine, a word processor, a work station, a videophone, a security television monitor, electronic binoculars, a POS terminal, a medical device (for example, an electronic thermometer, a sphygmomanometer, a blood glucose meter, an electrocardiographic measurement system, an ultrasonic diagnostic system, or an electronic endoscope), a fish finder, various measurement instruments, meters and gauges (for example, meters for vehicles, airplanes, and ships), postural control for robot, human body, etc., a flight simulator, etc., for example.

5. Mobile Unit

Figure 26:
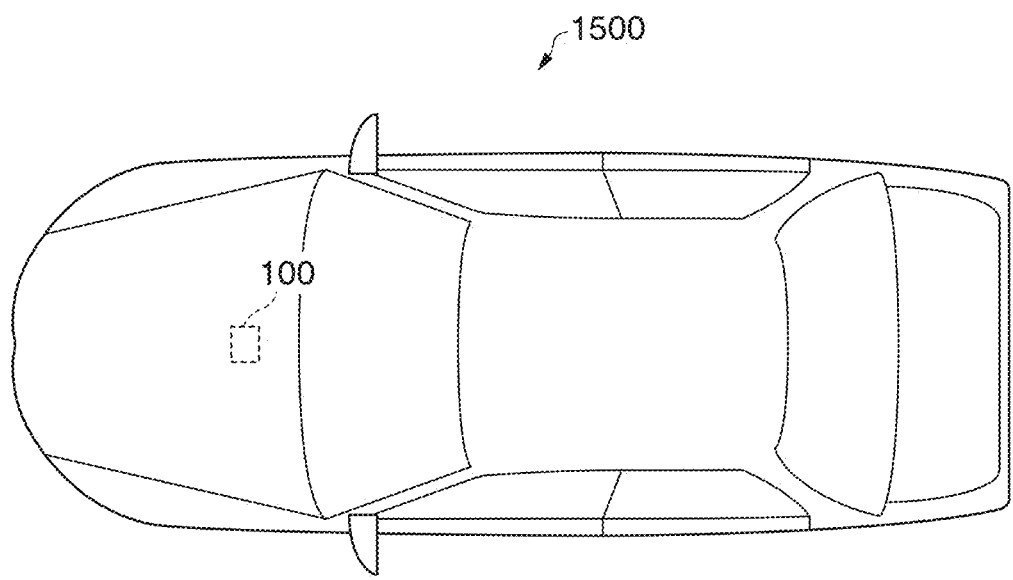
FIG. 26 is a top view schematically showing a mobile unit.

FIG. 26 is a diagram (top view) showing an example of a mobile unit of the embodiment. A mobile unit 1500 shown in FIG. 26 includes the gyro sensor 100 (or one of 101, 102, 103, 104, 105) according to the embodiment of the invention. Note that the mobile unit of the embodiment may have a configuration in which part of the component elements (the respective parts) is omitted or changed or another component element is added.

The mobile unit 1500 includes the gyro sensor in a navigation system or the like, and high reliability is required for control necessary for movement of the mobile unit.

By applying the gyro sensor 100 (or one of 101, 102, 103, 104, 105) according to the embodiment of the invention as the gyro sensor for mobile unit, high reliability may be secured.

As the mobile unit 1500, there are conceivable various mobile units and, for example, automobiles (including electric automobiles), aircraft such as a jet plane and a helicopter, ships, rockets, artificial satellites, etc.

The above described embodiments and modified examples are just examples, and not limited. For example, the respective embodiments and the respective modified examples may be appropriately combined.

The invention includes substantially the same configurations (for example, the configurations having the same functions, methods, and results, or the configurations having the same purposes and effects) as the configurations explained in the embodiments. Further, the invention includes the configurations in which non-essential parts of the configurations explained in the embodiments are replaced. Furthermore, the invention includes the configurations that may exert the same effects or the configurations that may achieve the same purposes as those of the configurations explained in the embodiments. In addition, the invention includes the configurations in which known technologies are added to the configurations explained in the embodiments.

The entire disclosure of Japanese Patent Application Nos. 2012-085862, filed Apr. 4, 2012 and 2013-028187, filed Feb. 15, 2013 are expressly incorporated by reference herein.

What is claimed is:

1. A gyro sensor comprising:
a vibrator;
a spring part extending from a first fixing part to the vibrator in a direction along a first axis;
a drive part that excites the vibrator; and
a detection part provided on the vibrator,
wherein the vibrator has, in a plan view,
first and second vibrating parts arranged side by side in the direction along the first axis and drive-vibrate in anti-phase with each other,
a connecting spring part that connects the first and second vibrating parts in the direction along the first axis, and
a first elastic member extending from the connecting spring part in a direction along a second axis intersecting with the first axis and fixed to a second fixing part,
wherein the connecting spring part extends in the direction along the first axis between the first and second vibrating parts, the connecting spring part includes members extending in the second axis direction and extension members extending in the first axis direction and connecting the members extending in the second axis direction, and the combination of the members extending in the second axis direction and the extension members causes the connecting spring part to traverse back and forth in the second axis direction,
wherein the first elastic member extends between the second fixing part and one of the extension members extending in the first axis direction and away from the connecting spring part, and
wherein the first elastic member and the second fixing part are disposed within a region between the first vibrating part and the second vibrating part.

2. The gyro sensor according to claim 1, wherein the vibrator includes a pair of the connecting spring parts and a pair of the first elastic members.

3. The gyro sensor according to claim 1, wherein the first elastic member is a plate-like member deformed in the direction along the first axis.

4. The gyro sensor according to claim 1, wherein the first elastic member includes a first extension part extending from the connecting spring part in the direction along the second axis, and a second extension part folding back from the first extension part and further extending toward the connecting spring part side.

5. The gyro sensor according to claim 4, wherein the first elastic member includes the first extension part extending from the connecting spring part in the direction along the second axis, and a third extension part extending in the direction along the second axis while extending back and forth from the first extension part in the direction along the first axis.

6. The gyro sensor according to claim 1, wherein, given that a spring constant of the connecting spring part from an extension position in which the first elastic member extends to the first vibrating part is a first spring constant and a spring constant from the extension position to the second vibrating part is a second spring constant, the first elastic member is provided so that the first spring constant and the second spring constant may be equal.

7. The gyro sensor according to claim 1, wherein a spring constant of the first elastic member in the direction along the first axis is smaller than a spring constant of the connecting spring part in the direction along the first axis.

8. The gyro sensor according to claim 1, wherein the connecting spring part includes a first side surface from which the first elastic member extends and a second side surface opposite to the first side surface,
further comprising a second elastic member extending from the second side surface and fixed to a third fixing part.

9. The gyro sensor according to claim 8, wherein the second elastic member extends in the extension position of the connecting spring part in which the first elastic member extends.

10. The gyro sensor according to claim 9, wherein a width of at least one of the first elastic member and the second elastic member is from 0.01 µm to 12 µm.

11. An electronic apparatus comprising the gyro sensor according to claim 1, wherein the electronic apparatus is one of a personal computer, digital still camera, and cellular phone.

12. An electronic apparatus comprising the gyro sensor according to claim 2, wherein the electronic apparatus is one of a personal computer, digital still camera, and cellular phone.

13. An electronic apparatus comprising the gyro sensor according to claim 3, wherein the electronic apparatus is one of a personal computer, digital still camera, and cellular phone.

14. An electronic apparatus comprising the gyro sensor according to claim 4, wherein the electronic apparatus is one of a personal computer, digital still camera, and cellular phone.

15. An electronic apparatus comprising the gyro sensor according to claim 5, wherein the electronic apparatus is one of a personal computer, digital still camera, and cellular phone.

16. A mobile unit comprising the gyro sensor according to claim 1, wherein the mobile unit is one of an automobile, an aircraft, a ship, a rocket, and an artificial satellite.

17. A mobile unit comprising the gyro sensor according to claim 2, wherein the mobile unit is one of an automobile, an aircraft, a ship, a rocket, and an artificial satellite.

18. A mobile unit comprising the gyro sensor according to claim 3, wherein the mobile unit is one of an automobile, an aircraft, a ship, a rocket, and an artificial satellite.

19. A mobile unit comprising the gyro sensor according to claim 4, wherein the mobile unit is one of an automobile, an aircraft, a ship, a rocket, and an artificial satellite.

20. A mobile unit comprising the gyro sensor according to claim 5, wherein the mobile unit is one of an automobile, an aircraft, a ship, a rocket, and an artificial satellite.

* * * * *